US012362496B2

(12) United States Patent
Takahashi et al.

(10) Patent No.: US 12,362,496 B2
(45) Date of Patent: Jul. 15, 2025

(54) PROTECTIVE PLATE-EQUIPPED REFLECTIVE MEMBER

(71) Applicant: AGC Inc., Tokyo (JP)

(72) Inventors: Kouichirou Takahashi, Tokyo (JP); Osamu Kagaya, Tokyo (JP); Akira Kumagai, Tokyo (JP); Shimpei Nagae, Tokyo (JP)

(73) Assignee: AGC INC., Tokyo (JP)

( * ) Notice: Subject to any disclaimer, the term of this patent is extended or adjusted under 35 U.S.C. 154(b) by 161 days.

(21) Appl. No.: 18/240,110

(22) Filed: Aug. 30, 2023

(65) Prior Publication Data

US 2023/0411863 A1 Dec. 21, 2023

Related U.S. Application Data

(63) Continuation of application No. PCT/JP2022/003667, filed on Jan. 31, 2022.

(30) Foreign Application Priority Data

Mar. 1, 2021 (JP) ................................ 2021-031839

(51) Int. Cl.
*H01Q 15/14* (2006.01)

(52) U.S. Cl.
CPC .................................. *H01Q 15/14* (2013.01)

(58) Field of Classification Search
CPC .......... H01Q 1/42; H01Q 1/422; H01Q 15/14; H01Q 15/16; H01Q 19/19
See application file for complete search history.

(56) References Cited

U.S. PATENT DOCUMENTS 5,977,914 A * 11/1999 Harano ................ H01Q 9/0407 343/893
11,336,031 B2 * 5/2022 Wang .................. H01Q 19/108
(Continued)

FOREIGN PATENT DOCUMENTS

JP 2003-032165 A 1/2003
JP 2014-030138 A 2/2014
(Continued)

OTHER PUBLICATIONS

Sze et al., "Substrate Thickness in a Microstrip Reflectarray", Microwave Conference, 1999 Asia Pacific Singapore, Nov. 30, 1999-Dec. 3, 1999, vol. 1, pp. 146-149.
(Continued)

*Primary Examiner* — Tho G Phan
(74) *Attorney, Agent, or Firm* — Foley & Lardner LLP

(57) ABSTRACT

A protective plate-equipped reflective member includes a reflective member that reflects or re-radiates a radio wave incident thereon; and a protective plate that is installed on a radio wave-incident side of the reflective member, wherein $d=\alpha\times\lambda_0/(1.75\times\varepsilon_r^{0.555})$ and $\alpha$ is greater than or equal to 1 and less than or equal to 1.25, where a wavelength specified with respect to an operating center frequency $f_0$ [Hz] is denoted by $\lambda_0$ [mm], a plate thickness of the protective plate is denoted by d [mm], a relative permittivity of the protective plate at the operating center frequency $f_0$ [Hz] is denoted by $\varepsilon_r$, and a constant is denoted by $\alpha$.

7 Claims, 14 Drawing Sheets

(56) References Cited

U.S. PATENT DOCUMENTS

| | | | | |
|---|---|---|---|---|
| 11,973,259 | B2 * | 4/2024 | Hiramatsu | H01Q 15/14 |
| 12,009,609 | B2 * | 6/2024 | Ikeda | H01Q 1/42 |
| 2015/0070246 | A1 | 3/2015 | Maruyama et al. | |

FOREIGN PATENT DOCUMENTS

| | | | |
|---|---|---|---|
| JP | 2020-010304 | A | 1/2020 |
| WO | WO-2020/240364 | A1 | 12/2020 |

OTHER PUBLICATIONS

International Searching Authority, "International Search Report," issued in connection with International Patent Application No. PCT/JP2022/003667, dated Apr. 19, 2022.

International Searching Authority, "Written Opinion," issued in connection with International Patent Application No. PCT/JP2022/003667, dated Apr. 19, 2022.

* cited by examiner

PROTECTIVE PLATE-EQUIPPED REFLECTIVE MEMBER

CROSS-REFERENCE TO RELATED APPLICATIONS

This application is a continuation of International Application PCT/JP2022/003667, filed on Jan. 31, 2022 and designated the U.S., which is based on and claims priority to Japanese Patent Application No. 2021-031839 filed on Mar. 1, 2021, with the Japan Patent Office. The entire contents of these applications are incorporated herein by reference.

TECHNICAL FIELD

The present disclosure relates to a protective plate-equipped reflective member.

BACKGROUND ART

A reflective member such as a reflector that reflects or re-radiates incoming radio waves is known.

Such a reflector is disclosed in, for example, Patent Document 1 as a configuration including a reflective board having a reflective surface that reflects incoming radio waves; a support building frame that is a structure body having multiple leg parts installed upright in a substantially vertical direction and configured to support the reflective board; and an adjustment mechanism that has a vertical direction adjustment mechanism that is coupled to each of the multiple leg parts in the support building frame and can vertically operate a coupling position with each leg part.

In addition, Patent Document 2 discloses a reflection array having multiple elements aligned in a first axial direction and a second axial direction perpendicular to the first axial direction and configured to reflect incident waves. This reflection array reflects the incident wave in a desired direction not in a plane containing the incident wave and the specular reflection wave.

Further, Patent Document 3 discloses a configuration in which a reflective plate having a predetermined radius in a microwave transmission device is installed at a place affording an unobstructed view from both an antenna of a first base station antenna and an antenna of a second base station, thereby reflecting microwave radio waves and performing microwave radio communication between the first base station and the second base station.

Reflectors are generally adjusted to face almost directly toward radio waves from a base station, and in the past, reflectors have often been installed in places where the view is unobstructed from the base station and out of reach of people, such as on mountaintops. However, in 5th generation mobile communication systems (5G) and beyond, it is envisioned that that reflectors will also be installed in city center environments, due to the low diffraction of radio waves having high frequencies, i.e., due to the high straightness and short propagation distance.

In such situations, in order to reduce dead zones, there is demand for reflectors that effectively reflect or re-radiate radio waves that are incident on the reflector at a wide angular range from a narrow angle to a wide angle. Here, re-radiate means to resonate in response to incoming radio waves and to radiate radio waves whose phases have changed. Also, narrow angle means that the angle with respect to the normal to the reflector is small. Wide angle means that the angle with respect to the normal to the reflector is large.

In a case where the reflector is installed near a person or a person's living space, however, a protective plate covering the reflector is required on the radio wave-incident side of the reflector to protect against dirt or the like caused by human contact.

It has been found that when such a protective plate is installed using conventional technology, the efficiency of reflection or re-radiation by the reflective member with a protective plate such as a reflector, i.e., a protective plate-equipped reflective member, gets significantly reduced due to the large transmission loss in the protective plate with respect to the radio waves entering at a wide angle.

The present disclosure has been made in view of the above and an object is to provide a protective plate-equipped reflective member that can effectively reflect or re-radiate radio waves incident on the reflective member over a wide angular range from a narrow angle to a wide angle.

CITATION LIST

Patent Literature

[Patent Document 1] Unexamined Japanese Patent Application Publication No. 2020-10304

[Patent Document 2] Unexamined Japanese Patent Application Publication No. 2014-30138

[Patent Document 3] Unexamined Japanese Patent Application Publication No. 2003-32165

SUMMARY OF THE INVENTION

According to at least one aspect of the present disclosure, there is provided a protective plate-equipped reflective member that includes a reflective member that reflects or re-radiates a radio wave incident thereon; and a protective plate that is installed on a radio wave-incident side of the reflective member, wherein $d=\alpha\times\lambda_0/(1.75\times\varepsilon_r^{0.555})$ and $\alpha$ is greater than or equal to 1 and less than or equal to 1.25, where a wavelength specified with respect to an operating center frequency $f_0$ [Hz] is denoted by $\lambda_0$ [mm], a plate thickness of the protective plate is denoted by d [mm], a relative permittivity of the protective plate at the operating center frequency $f_0$ [Hz] is denoted by $\varepsilon_r$, and a constant is denoted by $\alpha$.

According to the present disclosure, a protective plate-equipped reflective member that can effectively reflect or re-radiate incoming radio waves over a wide angular range from a narrow angle to a wide angle can be provided.

BRIEF DESCRIPTION OF THE DRAWINGS

FIG. 12B is a diagram of the TM wave;

MODES FOR CARRYING OUT THE INVENTION

Figure 1:
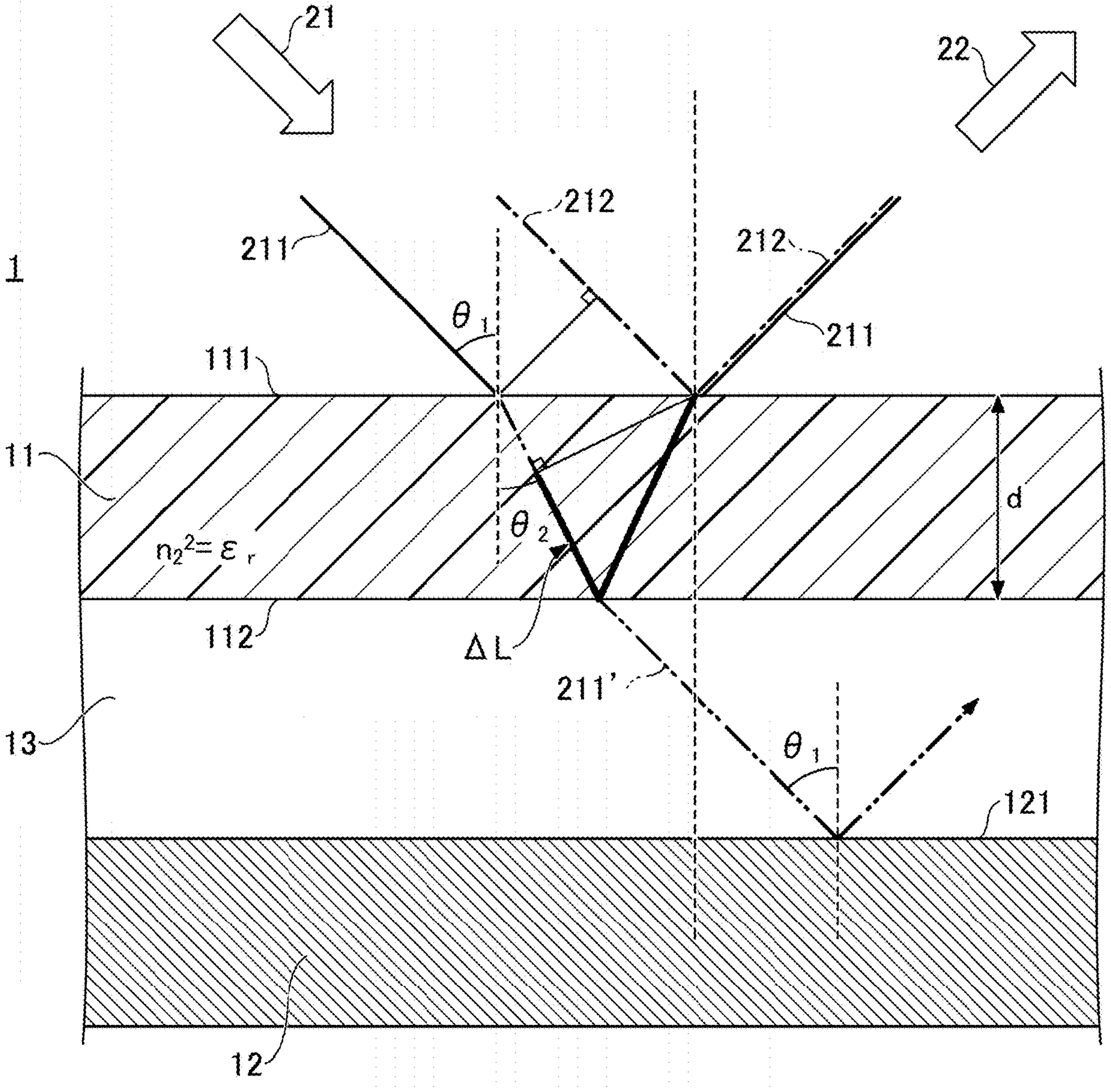
FIG. 1 is a diagram illustrating a protective plate-equipped reflector according to the first embodiment.

Hereinafter, embodiments of the present disclosure are described below with reference to the accompanying drawings. Throughout the drawings, the same components are denoted by the same reference numerals, and redundant descriptions are omitted accordingly.

First Embodiment

FIG. 1 is a diagram illustrating a protective plate-equipped reflector according to the first embodiment. A protective plate-equipped reflector 1 is a reflective member with a protective plate, i.e., a protective plate-equipped reflective member, that reflects incoming radio waves. FIG. 1 illustrates how radio waves approaching in an incident direction 21 are reflected in a reflection direction 22 by the protective plate-equipped reflector 1. As illustrated in FIG. 1, the protective plate-equipped reflector 1 includes a protective plate 11 and a reflector 12.

The protective plate 11 is a flat plate member that is permeable with respect to radio waves entering the protective plate-equipped reflector 1. The protective plate 11 is installed on the radio-wave incident side of the reflector 12 via an air layer 13 and covers the reflector 12 to protect the reflector 12 against dirt resulting from human contact and against other things.

Resin or glass can be used for the material of the protective plate 11. In the case where resin is used, fluorine resin is preferred and polytetrafluoroethylene (PTFE) is more preferred, from the standpoint of dirt repellence. In FIG. 1, $n_2$ represents the refractive index of the protective plate 11 whereas $\varepsilon_r$ represents the relative permittivity of the protective plate 11. The relative permittivity $\varepsilon_r$ is equal to the square of the refractive index $n_2$. Also, d represents the plate thickness of the protective plate 11.

The reflector 12 is a reflective member and includes a reflective surface 121. Among the radio waves incident on the protective plate-equipped reflector 1, the reflective surface 121 reflects any radio waves incident on the reflective surface 121 after having passed through the protective plate 11. There is no particular restriction on the material of the reflector 12, and, as such, materials suitable for reflecting radio waves can be selected accordingly.

In this embodiment, the reflective surface 121 is a flat surface. The normal to the protective plate-equipped reflector 1 is the same as the normal to the reflective surface 121. Also, since the reflective surface 121 and the protective plate 11 are parallel to each other, the normal to the protective plate-attached reflector 1 is the same as the normal to the protective plate 11.

Among the radio waves incident on the protective plate-equipped reflector 1 at an angle of incidence $\theta_1$, a first radio wave 211 passes through the first boundary surface 111 (i.e., the surface on which radio waves are incident) of the protective plate 11, whereas a second radio wave 212 is reflected by the first boundary surface 111. It is to be noted that the angle of incidence $\theta_1$ is an angle with respect to the normal to the protective plate 11.

The first radio waves 211 are refracted by the first boundary surface 111 and propagate inside the protective plate 11 in a direction indicated by the angle of refraction $\theta_2$, and then reach a second boundary surface 112 (i.e., the surface opposite to the first boundary surface 111) of the protective plate 11. Among the first radio waves 211 reaching the second boundary surface 112, some pass through the second boundary surface 112 whereas others are reflected by the second boundary surface 112. Passing radio waves 211' passing through the second boundary surface 112 pass through the air layer 13, reach the reflective surface 121, and then are reflected by the reflective surface 121.

In contrast to this, the first radio wave 211 reflected by the second boundary surface 112 propagates inside the protective plate 11 toward the first boundary surface 111, refracts at the first boundary surface 111, and then exits the protective plate 11 to the outside in the reflection direction 22.

In the propagation of the first radio wave 211, an optical path difference occurs in accordance with an optical path along which the first radio wave 211 passed through the inside of the protective plate 11 with respect to the optical path of the second radio wave 212 that was reflected by the first boundary surface 111. The optical path difference is represented by the bold line $\Delta L$ in FIG. 1.

(Method for Determining Thickness of Protective Plate)

Here, when transmission loss of radio waves passed through the protective plate 11 is minimum, the reflection efficiency of radio waves by the protective plate-equipped reflector 1 is at maximum. The condition in which transmission loss at the protective plate 11 is minimum is, for example, the condition in which no reflection occurs at the protective plate 11. In this embodiment, by optimizing the plate thickness d of the protective plate 11, the reflection by the protective plate 11 approaches the non-reflection condition, and thus the transmission loss at the protective plate 11 is reduced.

The relationship between the angle of incidence $\theta_1$ and the angle of refraction $\theta_2$ in the protective plate 11 is expressed by the following Equation (1):

Equation 1

$$\theta_2 = \sin^{-1}\left(\frac{1}{\sqrt{\varepsilon_r}}\sin\theta_1\right) \tag{1}$$

The v $\Delta L$, is expressed by the following Equation (2).

Equation 2

$$\begin{aligned}\Delta L &= 2n_2 d\cdot\cos\theta_2 \\ &= 2d\cdot\sqrt{\varepsilon_r - \sin^2\theta_1}\end{aligned} \tag{2}$$

Since the reflection at the first boundary surface 111 is a fixed-end reflection, the phase of the second radio wave 212 changes by r due to the reflection at the first boundary surface 111. In contrast to this, since the reflection at the second boundary surface 112 is a free-end reflection, the phase of the first radio wave 211 does not change due to the reflection at the second boundary surface 112. It is to be noted that the fixed-end reflection is a reflection that occurs when a radio wave incidents on a medium with a large refractive index from a medium with a small refractive index, whereas the free-end reflection is a reflection that occurs when a radio wave incidents on a medium with a small refractive index from a medium with a large refractive index.

When the phases are aligned between the peak of the amplitude at the first radio wave 211 and the anti-peak of the amplitude at the second radio wave 212, the reflection at the protective plate 11 is non-reflection owing to the peaks cancelling each other out. The peak of the amplitude means that the amplitude is the highest or the lowest. The anti-peak of the amplitude means that the amplitude is the highest or the lowest, opposite to what the peak is. For example, in a case where the peak of the amplitude is the highest, that is, the crest, the anti-peak of the amplitude is the lowest amplitude, that is, the valley. Alternatively, in a case where the peak of the amplitude is the lowest amplitude, then the anti-peak of the amplitude is the highest of the amplitude.

Conventionally, the angle of incidence of radio waves is assumed to be approximately 0 degrees, so it is normal to determine the plate thickness such that the phase of the peak of the amplitude in the radio wave reflected at the first boundary surface 111 and the phase of the anti-peak of the amplitude in the radio wave reflected at the second boundary surface 112 among the radio waves incident on the protective plate 11 at the angle of incidence of 0 degrees are aligned. That is, the plate thickness d of the protective plate has been determined by the following Equation (3).

$$d=\lambda_0/\{2\times\sqrt{(\varepsilon_r)}\} \tag{3}$$

However, with such a plate thickness, it is difficult to obtain a protective plate with good transmission characteristics at wide angles.

The inventors conducted a diligent study considering each phase of the peak of the amplitude of the first radio wave 211 and the anti-peak of the amplitude of the second radio wave 212, based on the optical path difference $\Delta L$. As a result, it was found that the transmission loss at the protective plate 11 can be effectively suppressed and the reflection efficiency of the radio waves by the protective plate-equipped reflector 1 can be ensured at a high level in a case where the plate thickness d of the protective plate 11 is determined in accordance with the following Equation (4) and Inequality (5).

$$d=\alpha\times\lambda_0/(1.75\times\varepsilon_r^{0.555}) \tag{4}$$

$$1\le\alpha\le1.25 \tag{5}$$

Here, $\lambda_0$ represents the wavelength [mm] specified with respect to the operating center frequency $f_0$ [Hz], d represents the plate thickness [mm] of the protective plate 11, $\varepsilon_r$ represents the relative permittivity of the protective plate 11 at the operating center frequency $f_0$ [Hz], and a represents a constant.

The operating center frequency $f_0$ represents the frequency serving as the center value among the frequencies of radio waves incident on the protective plate-equipped reflector 1. The wavelength $\lambda_0$ [mm] is defined by $1{,}000\times c/f_0$. The symbol c represents the speed of light and is approximately $3.0\times10^8$ m/s.

Equation (4) and Inequality (5) apply to both transverse electric waves (TE waves) and transverse magnetic waves (TM waves) in radio waves. In other words, the present embodiment includes both TE and TM waves.

The relative permittivity of the protective plate 11 is preferably 2 or more and 10 or less, and more preferably 2 or more and 5 or less. As long as the relative permittivity is in such a range, the protective film can be designed more easily with good characteristics over a wide band and at wide angles.

(Relationship Between $f/f_0$, Constant $\alpha$, and Normalized Transmission Loss)

Figure 2:
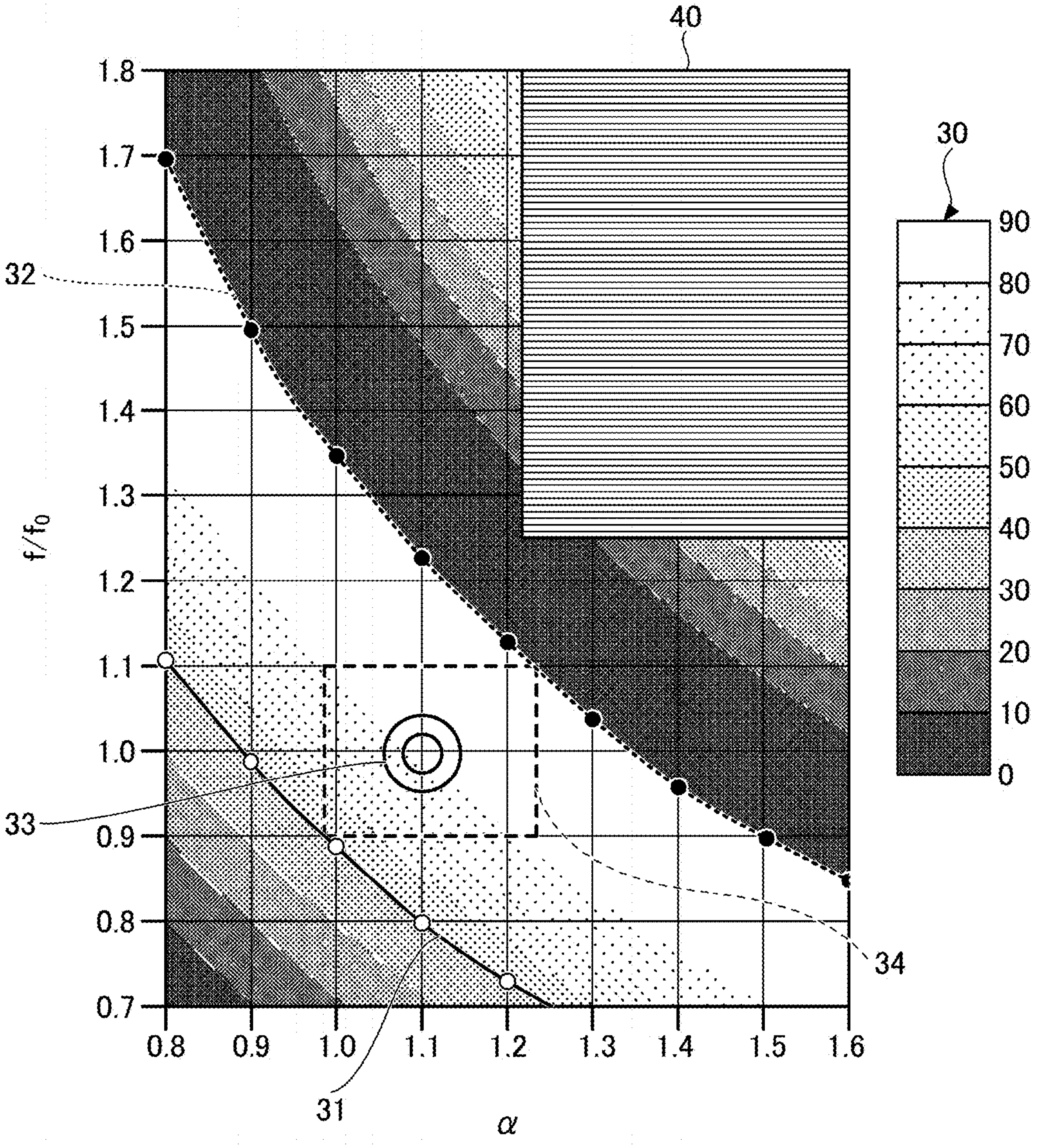
FIG. 2 is a diagram illustrating a relationship between $f/f_0$, constant $\alpha$, and an angle of incidence.

FIG. 2 is a diagram illustrating an example of the relationship between the operating center frequency $f_0$, constant $\alpha$, and angle of incidence according to this embodiment. The horizontal axis in FIG. 2 represents constant $\alpha$, whereas the vertical axis in FIG. 2 represents $f/f_0$ that is the ratio of the operating frequency f [Hz] to the operating center frequency $f_0$.

The concentration indicated by a color bar 30 represents the angle of incidence of the radio wave at which the normalized transmission loss is 1 dB. The white side with the lower concentration indicated by the color bar 30 indicates that the angle of incidence is larger and that the radio wave enters the protective plate 11 at a wider angle, whereas the black side with the higher concentration indicates that the angle of incidence is smaller and that the radio wave enters the protective plate 11 at a narrower angle.

Here, the normalized transmission loss is the transmission loss normalized such that the smallest transmission loss is 0 dB when $f/f_0$ is 1.0. Hereinafter, for the sake of simplicity, the angle of incidence of the radio wave whose normalized transmission loss is 1 dB is referred to as the allowable angle of incidence.

FIG. 2 illustrates the results of calculating the allowable angle of incidence by electromagnetic field analysis while changing the constant $\alpha$ and the operating frequency f, with the relative permittivity $\varepsilon_r$ and the operating center frequency $f_0$ determined in advance. The CST Studio Suite was used for the analysis. In the example of FIG. 2, $f_0$ is 28 GHz, f is greater than or equal to 20 GHz and less than or equal to 50 GHz, and $f/f_0$ is greater than or equal to 0.714 and less than or equal to 1.786.

A point 33 indicates that $f/f_0$ is 1.0 and that the constant $\alpha$ is 1.1. An area 40 indicated by horizontal hatching is an area for which no calculation has been performed.

In this embodiment, the constant $\alpha$ that which makes the allowable angle of incidence as large as possible is determined in accordance with FIG. 2, and then plate thickness d is determined by substituting the constant $\alpha$, the relative permittivity $\varepsilon_r$, and the wavelength $\lambda_0$ specified by the operating center frequency $f_0$ into Equation (4).

Here, in order to enhance robustness against variations in the operating frequency f, it is preferable that the constant $\alpha$ is determined such that the range of $f/f_0$ becomes as wide as possible.

The frequency range, in which the allowable angle of incidence is 60 degrees or more, around the operating center frequency $f_0$, is denoted by $\Delta f$ [Hz]. In this case, by having the constant $\alpha$ satisfy Inequality (5), the frequency range in which $f/f_0$ is 0.9 to 1.1 and $\Delta f/f_0$ is 20% are ensured.

In FIG. 2, the region between a lower boundary line 31 and an upper boundary line 32 is the region where the allowable angle of incidence is 60 degrees or more. A target region 34 enclosed by a square of dashed lines is the region where the constant $\alpha$ satisfies Inequality (5) and $f/f_0$ is greater than or equal to 0.9 and less than or equal to 1.1.

In view of ensuring a large frequency range, it is more preferable that the constant $\alpha$ is greater than or equal to 1 and less than or equal 1.23. In view of enhancing robustness against variations in the operating frequency f, the value of $\Delta f/f_0$ is preferably 10% or more, more preferably 15% or more, and even more preferably 20% or more.

EXAMPLES AND COMPARATIVE EXAMPLE

Examples and a comparative example are described below, but the present disclosure is by no means limited to these examples. Example 1 is a comparative example whereas Examples 2 to 4 are Examples.

Example 1

In Example 1, the protective plate 11 is made of PTFE, the operating center frequency $f_0$ is 28 GHz, the constant $\alpha$ is 0.097, and the plate thickness d is 3.7 mm. PTFE has a relative permittivity $\varepsilon_r$ of 2.1 and a loss factor tan $\delta$ of 0.001.

The plate thickness d in Example 1 was determined using Equation (3) described above such that the phase of the peak of the amplitude in the radio wave reflected at the first boundary surface 111 and the phase of the anti-peak of the amplitude in the radio wave reflected at the second boundary surface 112 among the radio waves incident on the protective plate 11 at an angle of incidence of 0 degrees are aligned.

Figure 3A:
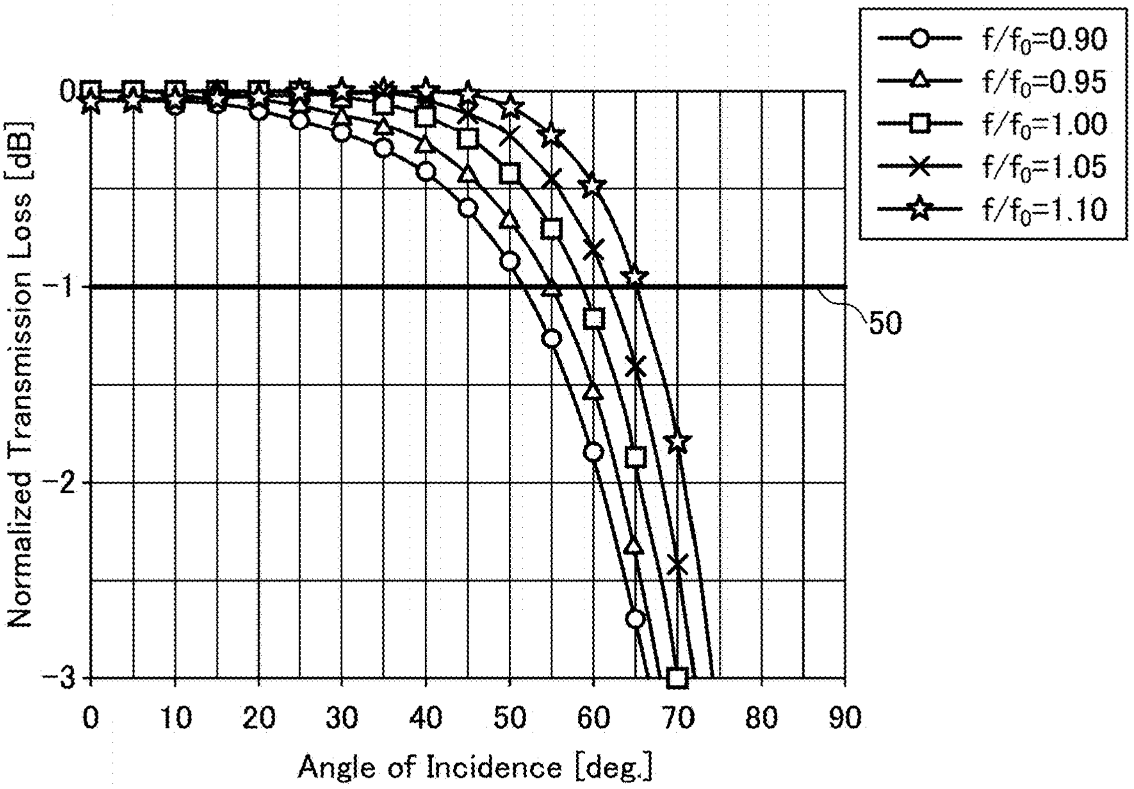
FIG. 3A and FIG. 3B are diagrams illustrating a relationship between an angle of incidence and normalized transmission loss in Example 1, FIG. 3A being a diagram of a TE wave and FIG. 3B being a diagram of a TM wave.
Figure 3B:
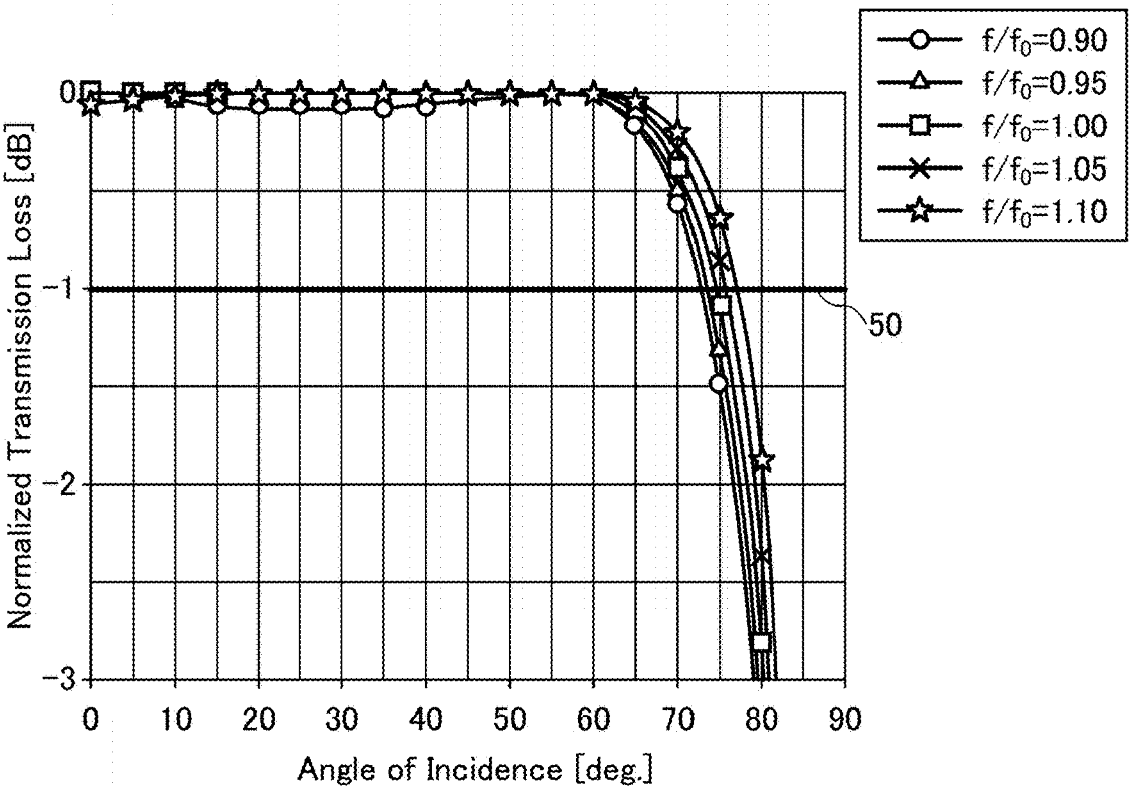

FIG. 3A and FIG. 3B illustrate the relationship between the angle of incidence and normalized transmission loss in Example 1. FIG. 3A illustrates the TE wave whereas FIG. 3B illustrates the TM wave. FIG. 3A and FIG. 3B illustrate the normalized transmission loss calculated by electromagnetic field analysis when the angle of incidence is changed. CST Studio Suite was used for the analysis. The horizontal axis in FIG. 3A and FIG. 3B represent the angle of incidence of the radio wave with respect to the protective plate 11, whereas the vertical axis represents the normalized transmission loss. In the legend, the cases, with $f/f_0$ being from 0.90 to 1.10 in 0.05 increments, are illustrated. A threshold 50 represents a normalized transmission loss of 1 dB. The view and meanings of drawings are the same in Examples 2 to 4 below.

As illustrated in FIG. 3A and FIG. 3B, in Example 1, the normalized transmission loss was the lowest when the angle of incidence was 0 degrees for all of the $f/f_0$, and gradually increased as the angle of incidence increased. For TE waves, the allowable angle of incidence was 52 degrees when $f/f_0$ was 0.90, and this was the lowest one.

For the TM wave, the difference between the values of $f/f_0$ was small compared to that of the TE wave. The allowable angle of incidence 74 degrees when $f/f_0$ was 0.90, and this was the lowest one.

Example 2

In Example 2, the protective plate 11 is made of PTFE, the operating center frequency $f_0$ is 28 GHz, and the constant $\alpha$ is 1.1. The plate thickness d was determined by the above equation (4). PTFE has a relative permittivity $\varepsilon_r$ of 2.1 and a loss factor tan $\delta$ of 0.001.

Figure 4A:
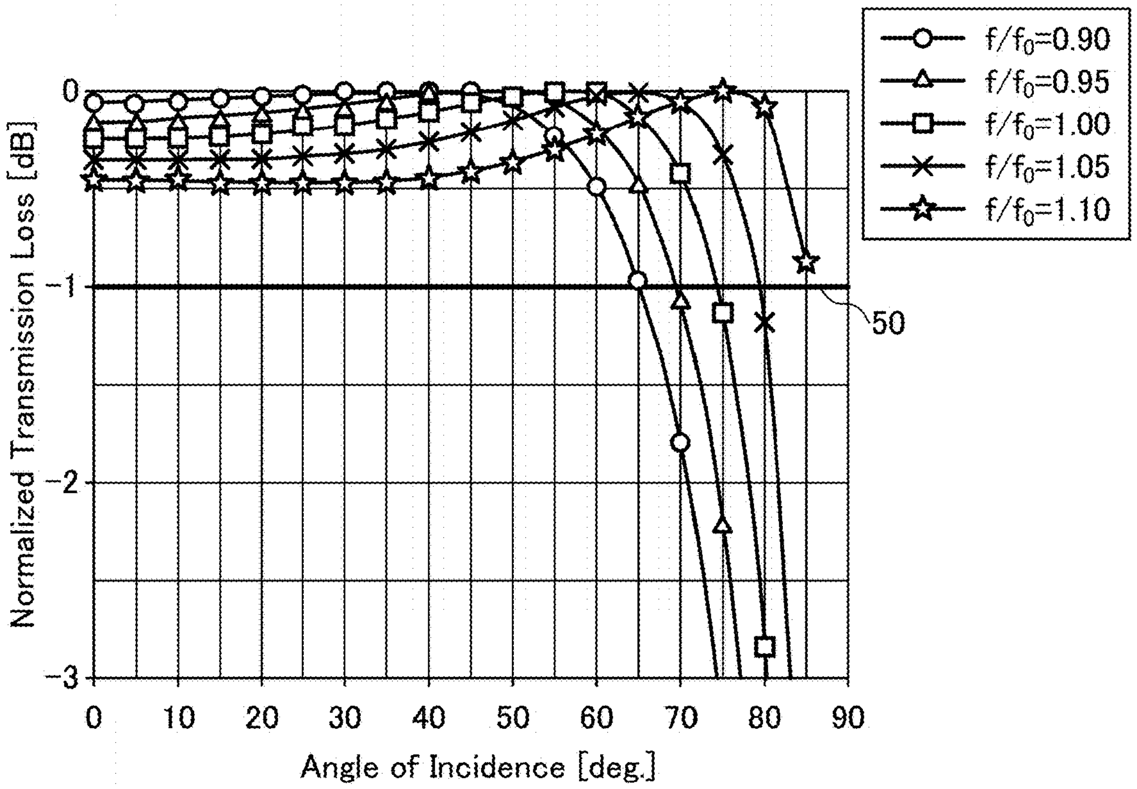
FIG. 4A and FIG. 4B are diagrams illustrating a relationship between an angle of incidence and normalized transmission loss in Example 2, FIG. 4A being a diagram of the TE wave and FIG. 4B being a diagram of the TM wave.
Figure 4B:
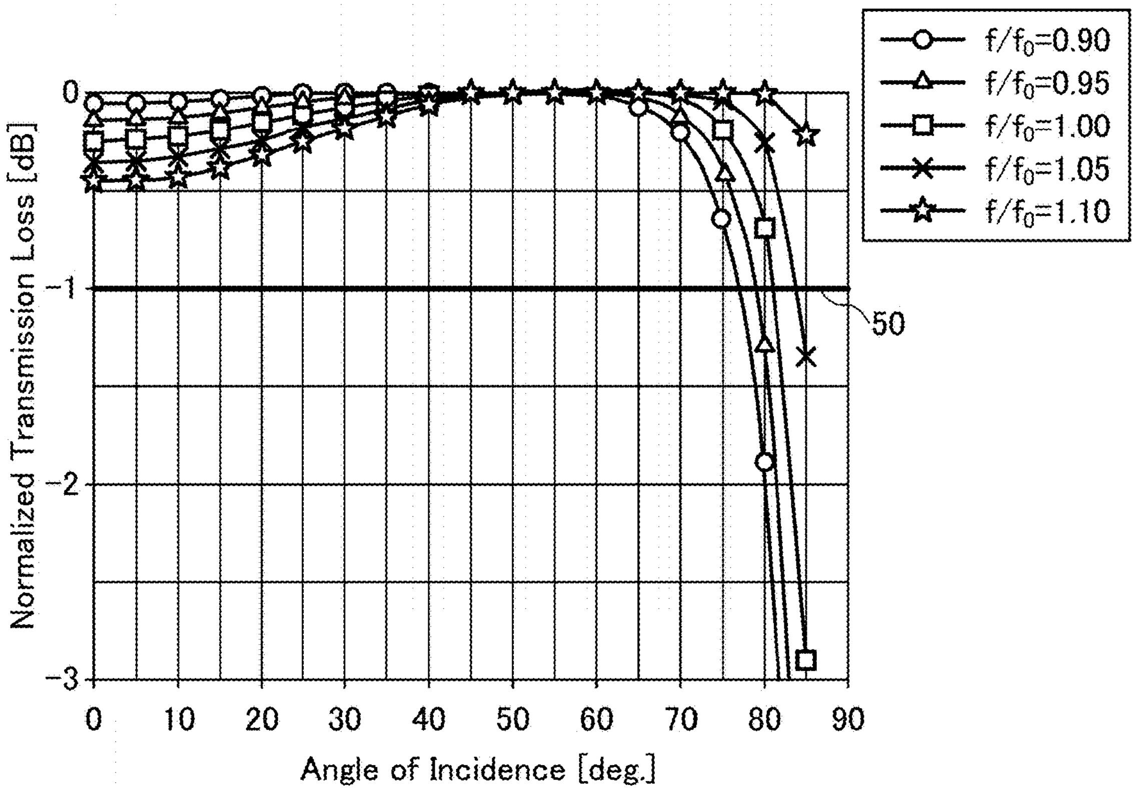

FIG. 4A and FIG. 4B illustrate the relationship between the angle of incidence and the normalized transmission loss in Example 2. FIG. 4A illustrates the TE wave whereas FIG. 4B illustrates the TM wave.

As illustrated in FIG. 4A and FIG. 4B, in Example 2, for both the TE and TM waves, the normalized transmission loss was smallest where $f/f_0$ was 0.90 in the case where the angle of incidence was 0 degrees, and the normalized transmission loss increased as the $f/f_0$ was increased.

Also, for both the TE and TM waves, the normalized transmission loss of the protective plate 11 decreased as the angle of incidence of the radio wave changed from 0 degrees to 50 degrees at the operating center frequency $f_0$ ($f/f_0$ is 1.0), and then after reaching the minimum value, the normalized loss of the protective plate 11 increased.

For the TE wave in Example 2, the allowable angle of incidence was 65 degrees when $f/f_0$ was 0.90, and this was the lowest one. Therefore, the lowest allowable angle of incidence for the TE wave in Example 2 is large compared to 52 degrees in Example 1. The lowest allowable angle of incidence refers to the lowest of the allowable angles of incidence.

For the TM wave in Example 2, the allowable angle of incidence was 77 degrees when $f/f_0$ is 0.90, and this was the lowest one. Therefore, the lowest allowable angle of incidence of the TE wave in Example 2 is large compared to 74 degrees in Example 1.

From the above, it was found that the lowest allowable angle of incidence of both TE and TM waves is large and a wide angle in Example 2 compared to Example 1.

Example 1 and Example 2 only differ from each other in terms of the method of determining the plate thickness d of the protective plate 11, and, as such, the other conditions are the same. Therefore, by the method of determining the plate thickness d in Example 2, it was found that the protective plate-equipped reflector 1 can more effectively reflect or re-radiate radio waves incident the protective plate-equipped reflector 1 over a wider angular range than that of the comparative example.

Example 3

In Example 3, the protective plate 11 is made of PTFE, the operating center frequency $f_0$ is 40 GHz, and the constant $\alpha$ is 1.1. The plate thickness d was determined by the above Equation (4). PTFE has a relative permittivity $\varepsilon_r$ of 2.1 and a loss factor tan $\delta$ of 0.001.

Figure 5A:
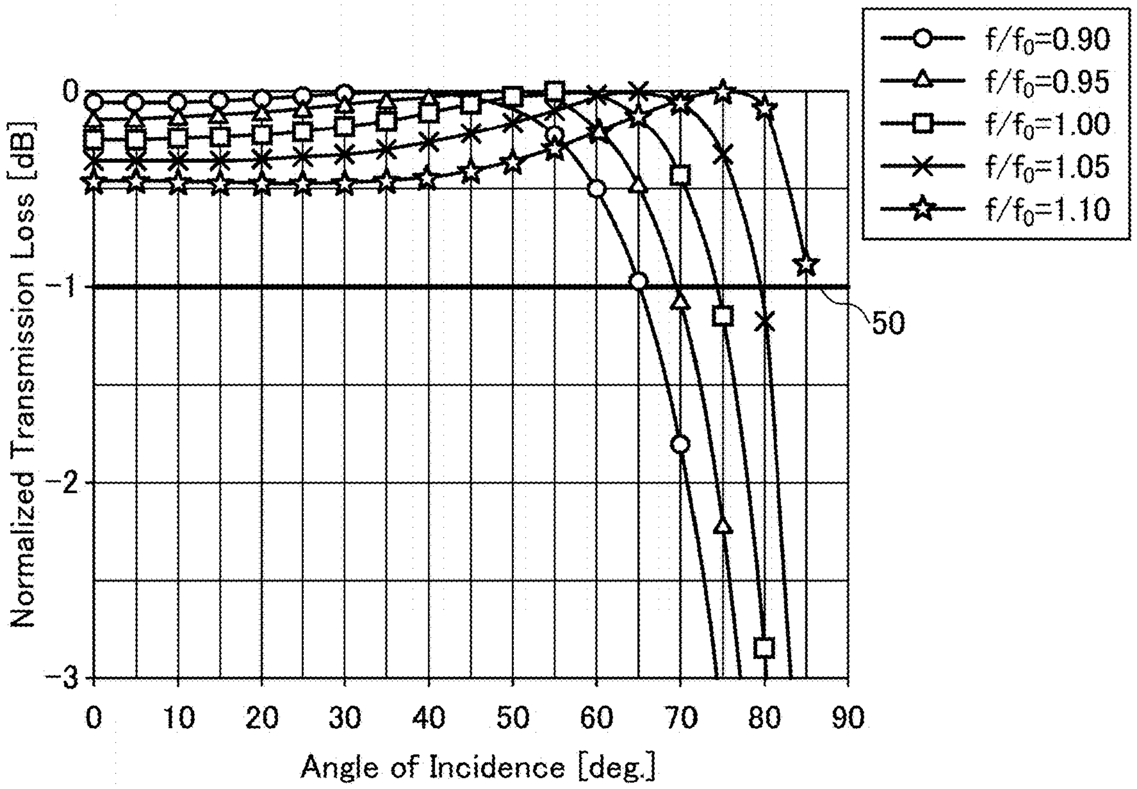
FIG. 5A and FIG. 5B are diagrams illustrating a relationship between an angle of incidence and normalized transmission loss in Example 3, FIG. 5A being a diagram of the TE wave and FIG. 5B being a diagram of the TM wave.
Figure 5B:
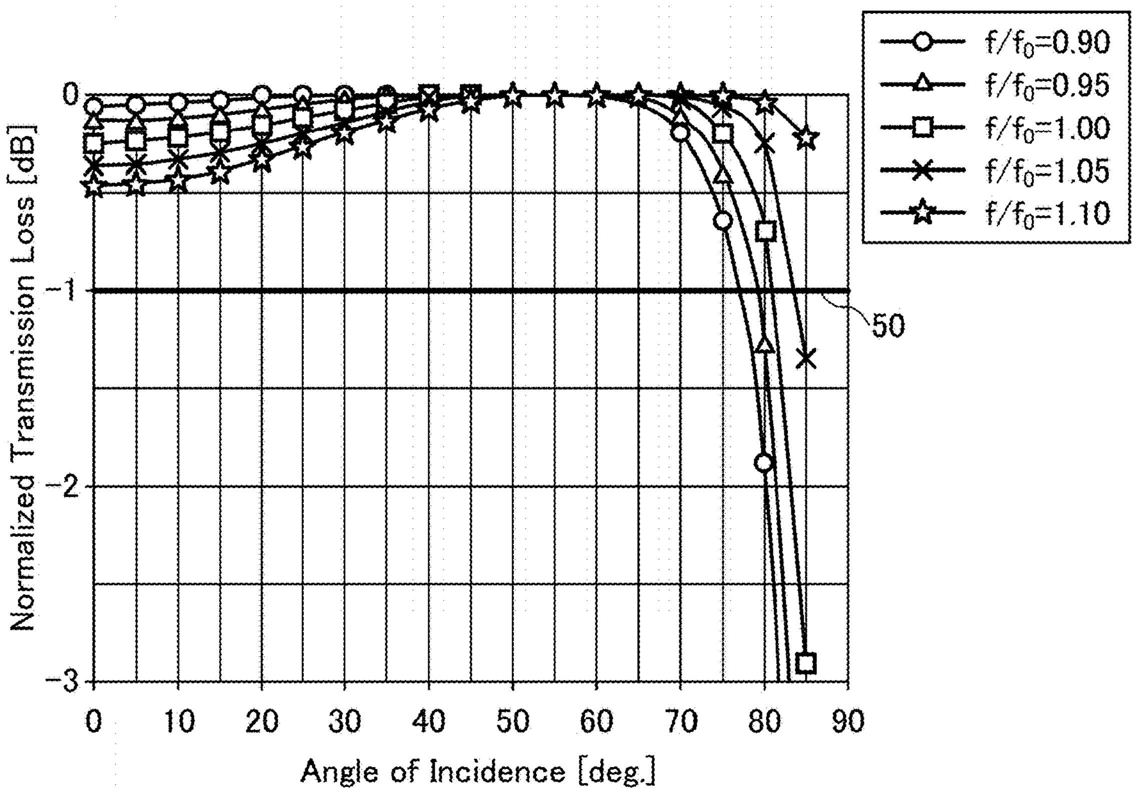

FIG. 5A and FIG. 5B illustrate the relationship between the angle of incidence and normalized transmission loss in Example 3. FIG. 5A illustrates the TE wave whereas FIG. 5B illustrates the TM wave.

As illustrated in FIG. 5A and FIG. 5B, in Example 3, almost the same results as in Example 2 were obtained, and it was found that the relationship between the angle of incidence and the normalized transmission loss was almost unchanged even when the operating center frequency $f_0$ changed.

Example 4

In Example 4, the protective plate 11 is made of glass, the operating center frequency $f_0$ is 28 GHz, and the constant $\alpha$ is 1.0. The plate thickness d was determined by the above Equation (4). The glass has a relative permittivity $\varepsilon_r$ of 6.8 and a loss factor tan $\delta$ of 0.02.

Figure 6A:
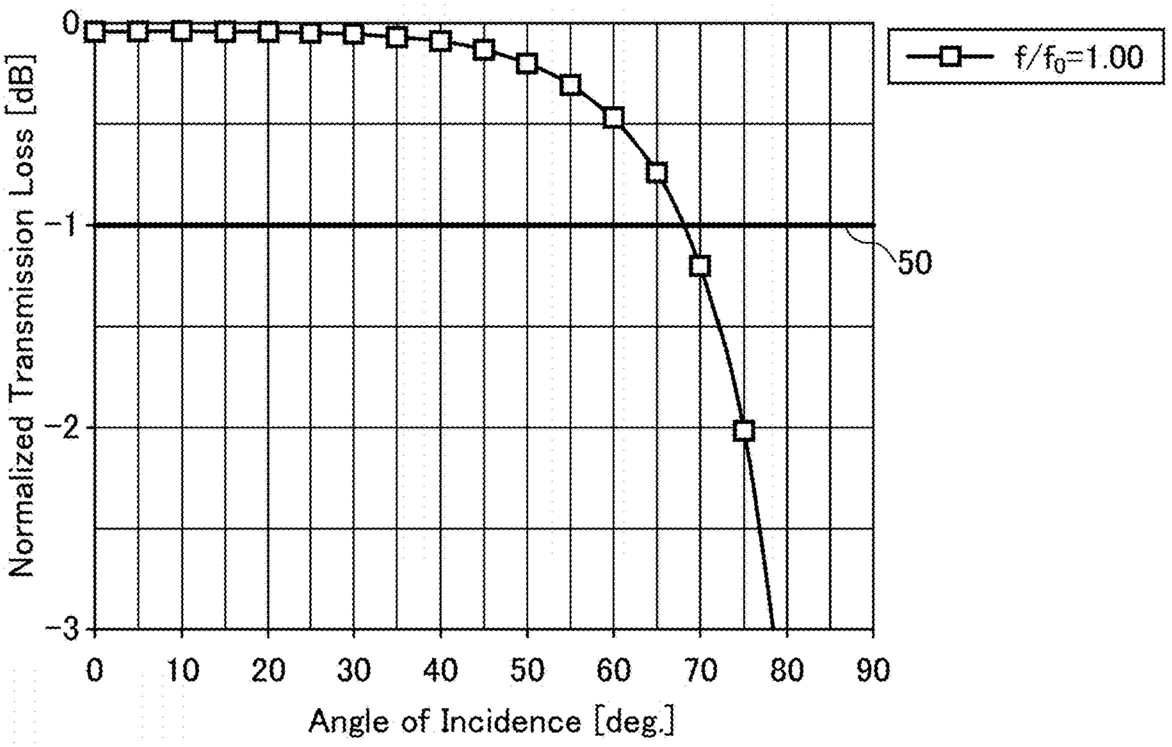
FIG. 6A and FIG. 6B are diagrams illustrating a relationship between angle of incidence and normalized transmission loss in Example 4, FIG. 6A being a diagram of the TE wave and FIG. 6B being a diagram of the TM wave.
Figure 6B:
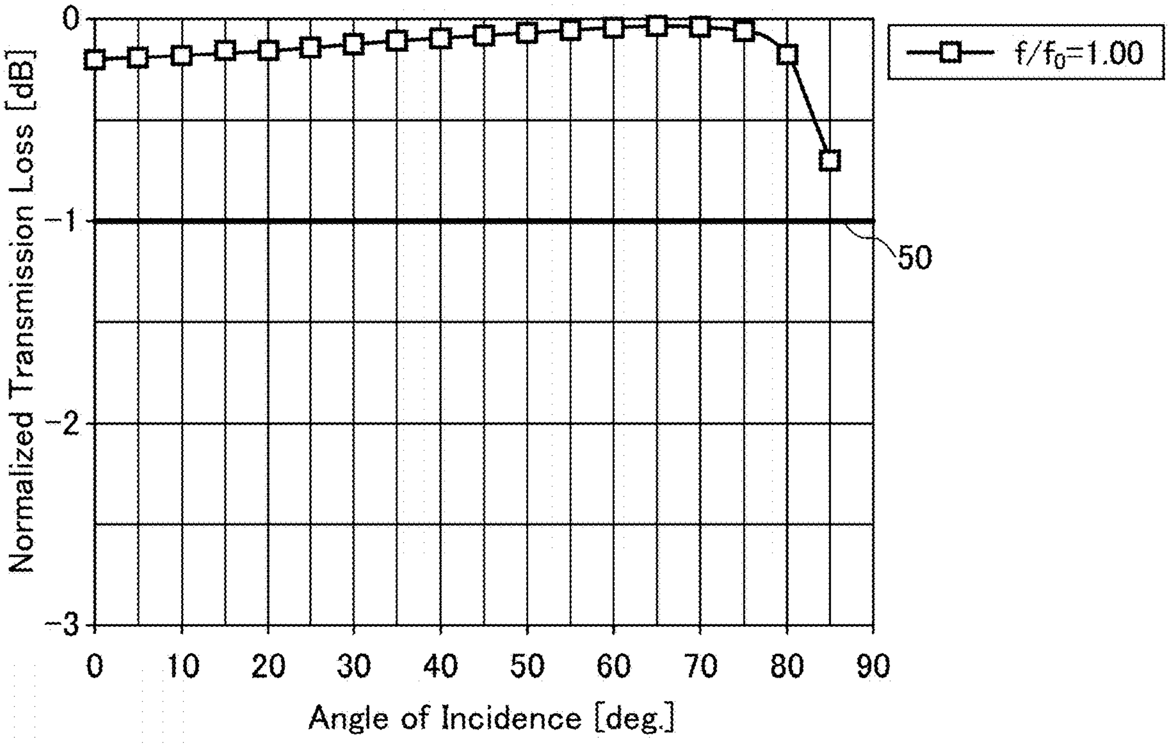

FIG. 6A and FIG. 6B illustrate the relationship between the angle of incidence and normalized transmission loss in Example 4. FIG. 6A illustrates the TE wave whereas FIG. 6B illustrates the TM wave. FIG. 6A and FIG. 6B illustrate only when $f/f_0$ is 1.0.

As illustrated in FIG. 6A and FIG. 6B, for the TE wave, the allowable angle of incidence is 68 degrees. For the TM wave, the normalized transmission loss is no greater than 1 dB even at 85 degrees, which is the highest angle of incidence.

When $f/f_0$ is 0.9 or 1.1, although not illustrated, the result is slightly inferior to other examples. It is presumed that this is due to the protective plate having a relatively-high relative permittivity of 6.8.

(Working Effect of Protective Plate-Equipped Reflector 1)

As described above, the protective plate-equipped reflector 1 has the reflector 12 that reflects incoming radio waves and the protective plate 11 that is installed on the radio wave-incident side of the reflector 12. Also, in a case where the wavelength specified with respect to the operating center frequency $f_0$ Hz is denoted by $\lambda_0$ [mm], the plate thickness of the protective plate 11 is denoted by d [mm], the relative permittivity of the protective plate 11 at the operating center frequency $f_0$ Hz is denoted by $\varepsilon_r$, and the constant is denoted by $\alpha$, d is equal to $\alpha\times\lambda_0/(1.75\times\varepsilon_r^{0.555})$, and $\alpha$ is greater than or equal to 1 and less than or equal to 1.25.

As a result, the angular range of an angle of incidence in which the normalized transmission loss at the protective plate 11 becomes 1 dB can be widened, and the protective plate-equipped reflector 1, that can reflect radio waves well in a wide angular range from a narrow angle to a wide angle, can be provided.

Second Embodiment

A protective plate-equipped reflector according to the second embodiment is described. The components that are the same as those in the first embodiment are denoted by the same reference numerals, and redundant descriptions are omitted accordingly.

Figure 7:
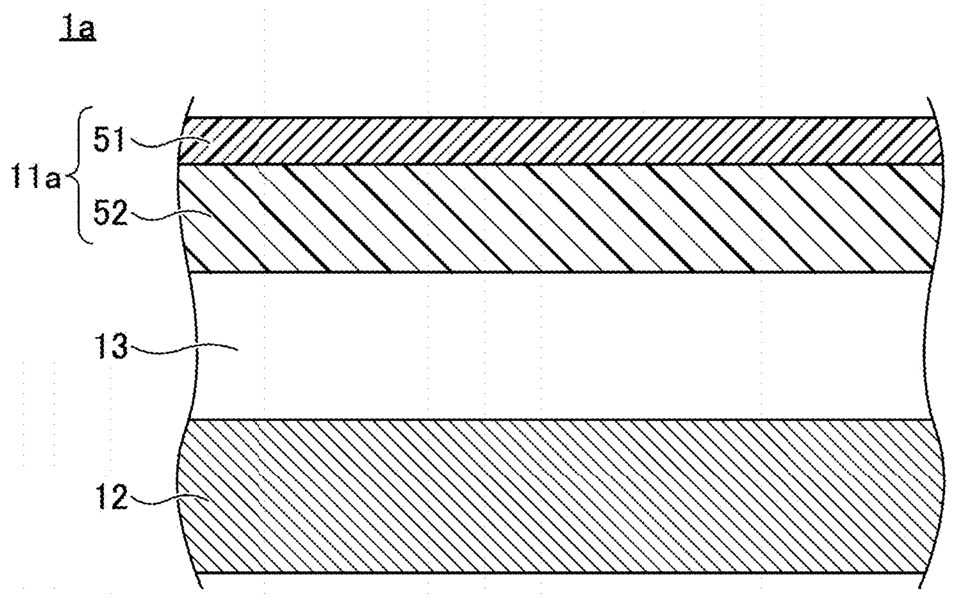
FIG. 7 is a diagram illustrating a configuration of a protective plate-equipped reflector according to a second embodiment.

FIG. 7 is a diagram illustrating a configuration of a protective plate-equipped reflector 1*a* according to the second embodiment. The protective plate-equipped reflector la includes a protective plate 11*a*. The protective plate 11*a* has a first dielectric layer 51 and a second dielectric layer 52 that is provided between the first dielectric layer 51 and the reflector 12. The function of the protective plate-equipped reflector 1*a* is substantially the same as that of the protective plate-equipped reflector 1, and the function of the protective plate 11*a* is substantially the same as that of the protective plate 11.

Resin or the like can be used for the material of the first dielectric layer 51, and resin, glass, or the like can be used for the material of the second dielectric layer 52. Since the first dielectric layer 51 is exposed to the outside air, it is preferable that the material has excellent weather resistance, excellent chemical resistance, excellent abrasion resistance, excellent heat resistance, and the like. Since the second dielectric layer 52 is not exposed to the outside air, it is preferable that the material has excellent availability, excellent processability, excellent affordability, and so on.

The protective plate 11*a* can be fabricated, for example, by forming the second dielectric layer 52 and then covering the surface of the second dielectric layer 52 opposite to the surface of the dielectric layer 52 facing the reflector 12 with the first dielectric layer 51.

Figure 8:
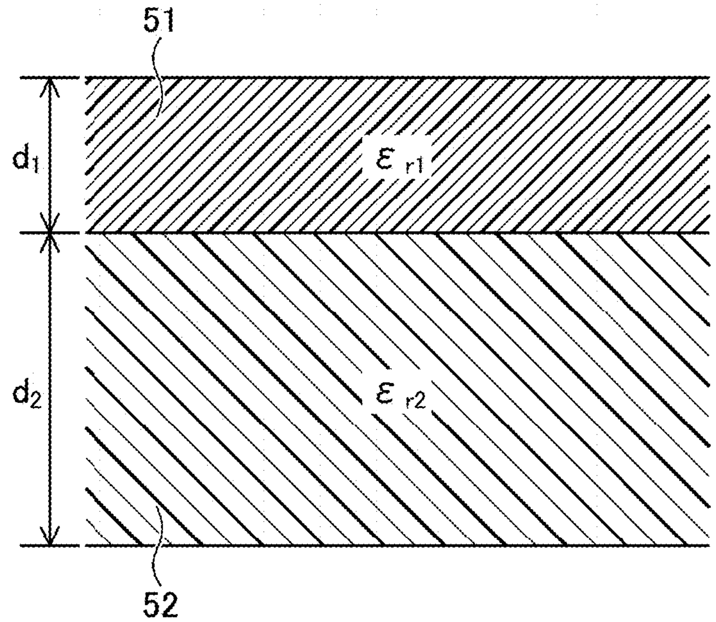
FIG. 8 is a diagram illustrating the relative permittivity and layer thickness of a protective plate according to the second embodiment.

FIG. 8 is a diagram illustrating the relative permittivity and layer thickness of the protective plate 11*a*. The effective relative permittivity $\varepsilon_{ra}$ and the plate thickness da of the protective plate 11*a* are expressed by the following Equation (6) and Equation (7), where the layer thickness of the first dielectric layer 51 is denoted by $d_1$ [mm], the relative permittivity of the first dielectric layer 51 is denoted by $\varepsilon_{r1}$, the layer thickness of the second dielectric layer 52 is denoted by $d_2$ [mm], and the relative permittivity of the second dielectric layer 52 is denoted by $\varepsilon_{r2}$.

$$\varepsilon_{ra}=\{(d_1+d_2)\times\varepsilon_{r1}\times\varepsilon_{r2}\}/(d_1\times\varepsilon_{r2}+d_2\times\varepsilon_{r1}) \quad (6)$$

$$da=d_1+d_2 \quad (7)$$

The protective plate 11*a* satisfies the conditions expressed by Equation (8) and Inequality (9) below.

$$da=\alpha\times\lambda_0/(1.75\times\varepsilon_{ra}^{0.555}) \quad (8)$$

$$1\leq\alpha\leq1.25 \quad (9)$$

EXAMPLES

Examples of the second embodiment are described below, but the present disclosure is not limited in any way to these examples. Examples 5 to 10 are all Examples.

In each example, the normalized transmission losses at varying angles of incidence were calculated and evaluated by electromagnetic field analysis using the CST Studio Suite under seven different conditions, A to G, each with a different $f/f_0$ and constant $\alpha$.

Figure 9:
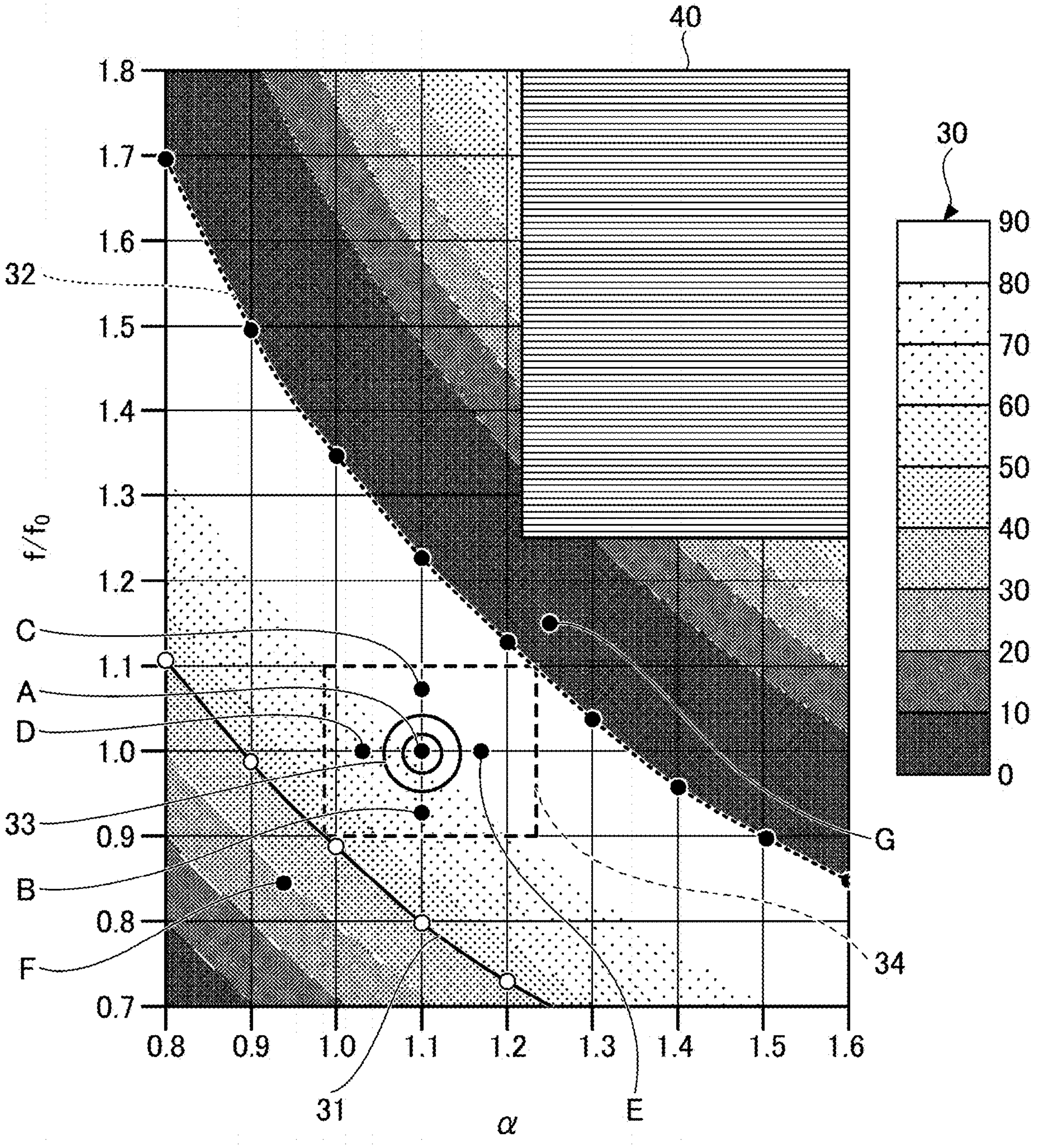
FIG. 9 is a diagram illustrating conditions of $f/f_0$ and constant $\alpha$ of the Examples of the second embodiment.

FIG. 9 is a diagram illustrating $f/f_0$ and constant $\alpha$ under each of the conditions A to G. FIG. 9 illustrates the relationship between $f/f_0$, constant $\alpha$, and the angle of incidence as in FIG. 2, and plots $f/f_0$ and constant $\alpha$ under each of the conditions A to G.

The materials used for the first dielectric layer 51 include PTFE, Poly Vinylidene Di-fluoride (PVDF); Perfluoroalkoxy Alkane (PFA), and Ethylene Tetrafluoro Ethylene (ETFE). Table 1 below illustrates the relative permittivity $\varepsilon_{r1}$ and tan $\delta_1$ of each of these materials.

TABLE 1

| Material | $\varepsilon_{r1}$ | tan $\delta_1$ |
|---|---|---|
| PTFE | 2.1 | 0.0002 |
| PVDF | 7.4 | 0.033 |
| PFA | 2.1 | 0.0003 |
| ETFE | 2.55 | 0.0028 |

TABLE 1-continued

| Material | $\varepsilon_{r1}$ | tan $\delta_1$ |
|---|---|---|

The materials used for the second dielectric layer 52 include Polycarbonate (PC), Polyvinyl chloride (PVC), Acrylonitrile Butadiene Styrene (ABS) resin, Polyethylene Terephthalate (PET), and glass. Table 2 below illustrates the relative permittivity $\varepsilon_{r2}$ and tan $\delta_2$ of each of these materials.

TABLE 2

| Material | $\varepsilon_{r2}$ | tan $\delta_2$ |
|---|---|---|
| PC | 2.9 | 0.09 |
| PVC | 2.95 | 0.0125 |
| ABS | 3.1 | 0.011 |
| PET | 3.075 | 0.0527 |
| Glass | 6.8 | 0.016 |

In the evaluations, an evaluation of "Good" was given in a case where both TE and TM waves satisfied the criterion in which an angle of incidence is 60 degrees or more and the normalized transmission loss is less than or equal to the normalized transmission loss threshold of 1 dB, whereas an evaluation of "Bad" was given in a case where one or both of the TE and TM waves did not satisfy the criterion.

Example 5

Table 3 illustrates the details of conditions A to G in Example 5 and the evaluation result under each condition. In Table 3, the term "first layer" indicates the material of the first dielectric layer 51 and the term "second layer" indicates the material of the second dielectric layer 52. These points are the same in Tables 4 to 8 illustrated below.

TABLE 3

| | $f/f_0$ | f | α | First layer | $d_1$ | Second layer | $d_2$ | da | Evaluation |
|---|---|---|---|---|---|---|---|---|---|
| A | 1.00 | 28.0 | 1.10 | PTFE | 0.05 | PC | 3.69 | 3.74 | Good |
| B | 0.95 | 26.6 | 1.10 | PTFE | 0.05 | PC | 3.69 | 3.74 | Good |
| C | 1.05 | 29.4 | 1.10 | PTFE | 0.05 | PC | 3.69 | 3.74 | Good |
| D | 1.00 | 28.0 | 1.05 | PTFE | 0.05 | PC | 3.57 | 3.62 | Good |
| E | 1.00 | 28.0 | 1.15 | PTFE | 0.05 | PC | 3.86 | 3.91 | Good |
| F | 0.85 | 23.8 | 0.95 | PTFE | 0.05 | PC | 3.18 | 3.23 | Bad |
| G | 1.15 | 32.2 | 1.15 | PTFE | 0.05 | PC | 4.20 | 4.25 | Bad |

Figure 10A:
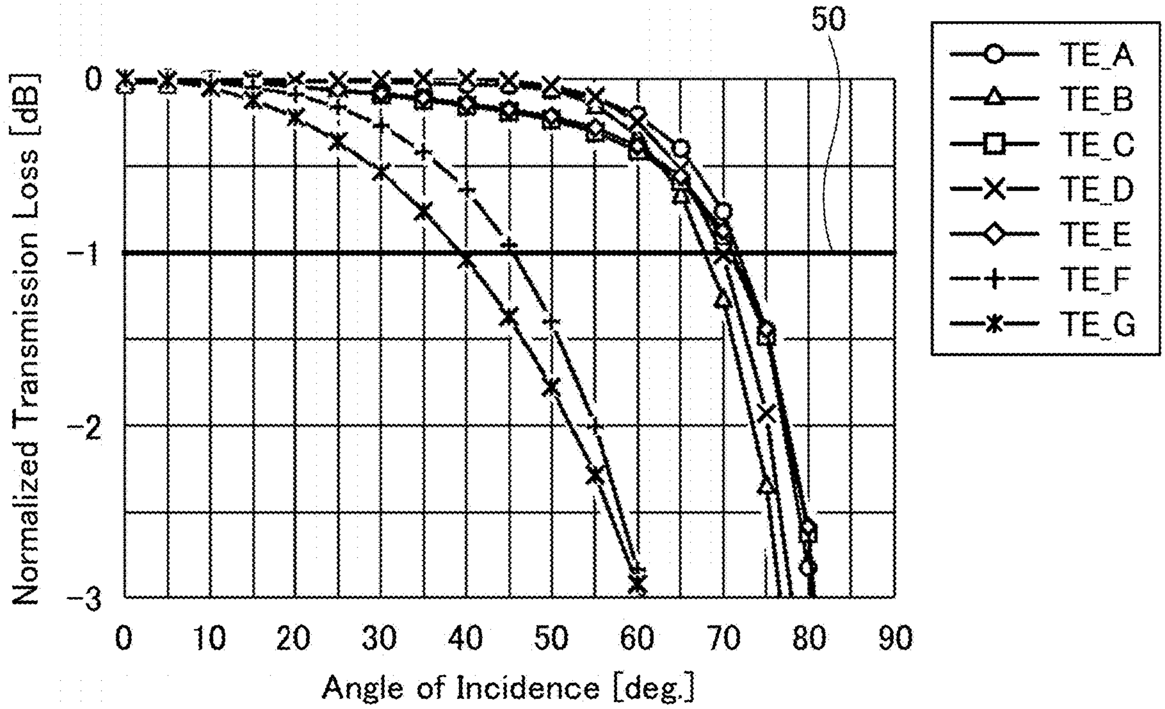
FIG. 10A and FIG. 10B are diagrams illustrating a relationship between the an angle of incidence and normalized transmission loss in Example 5, FIG. 10A being a diagram of the TE wave and FIG. 10B being a diagram of the TM wave.
Figure 10B:
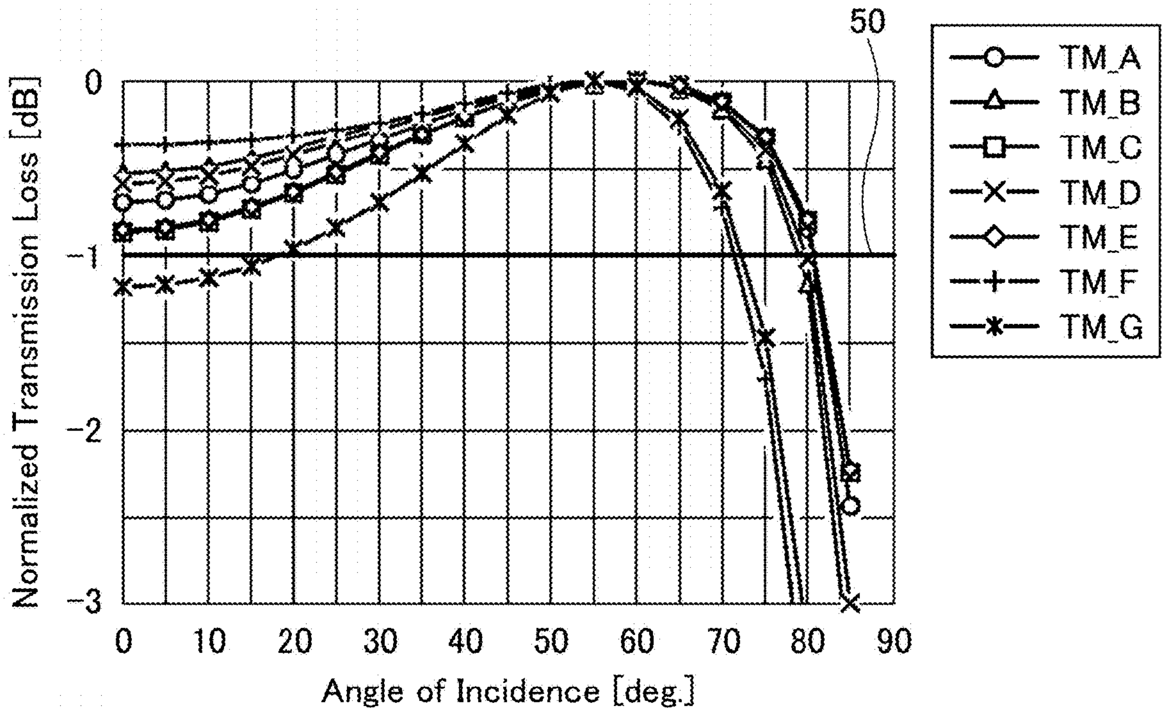

FIG. 10A and FIG. 10B are diagrams illustrating a relationship between an angle of incidence and normalized transmission loss in Example 5. FIG. 10A is a diagram of the TE wave whereas FIG. 10B is a diagram of the TM wave. The graphs in FIG. 10A and FIG. 10*b* each indicate the result under each condition. These points are the same in FIGS. 11A to 15B illustrated below.

As illustrated in Table 3 and FIG. 10A and FIG. 10B, in Example 5, the evaluation was "Bad" under conditions F and G, and "Good" under the other conditions.

Example 6

Table 4 illustrates the details of conditions A to G in Example 6 and the evaluation result under each condition.

TABLE 4

| | $f/f_0$ | f | α | First layer | $d_1$ | Second layer | $d_2$ | da | Evaluation |
|---|---|---|---|---|---|---|---|---|---|
| A | 1.00 | 28.0 | 1.10 | PTFE | 0.05 | PVC | 3.66 | 3.71 | Good |
| B | 0.95 | 26.6 | 1.10 | PTFE | 0.05 | PVC | 3.66 | 3.71 | Good |
| C | 1.05 | 29.4 | 1.10 | PTFE | 0.05 | PVC | 3.66 | 3.71 | Good |
| D | 1.00 | 28.0 | 1.05 | PTFE | 0.05 | PVC | 3.49 | 3.54 | Good |
| E | 1.00 | 28.0 | 1.15 | PTFE | 0.05 | PVC | 3.82 | 3.87 | Good |
| F | 0.85 | 23.8 | 0.95 | PTFE | 0.05 | PVC | 3.15 | 3.20 | Bad |
| G | 1.15 | 32.2 | 1.15 | PTFE | 0.05 | PVC | 4.16 | 4.21 | Bad |

Figure 11A:
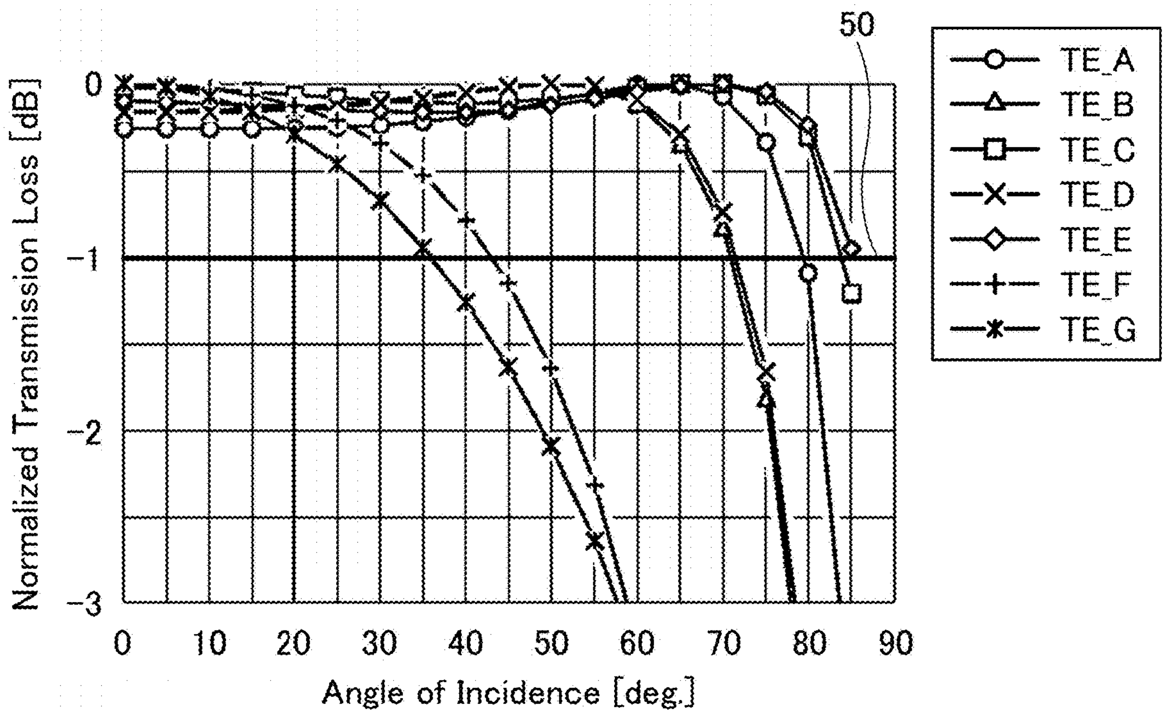
FIG. 11A and FIG. 11B are diagrams illustrating a relationship between an angle of incidence and normalized transmission loss in Example 6, FIG. 11A being a diagram of the TE wave and FIG. 11B being a diagram of the TM wave.
Figure 11B:
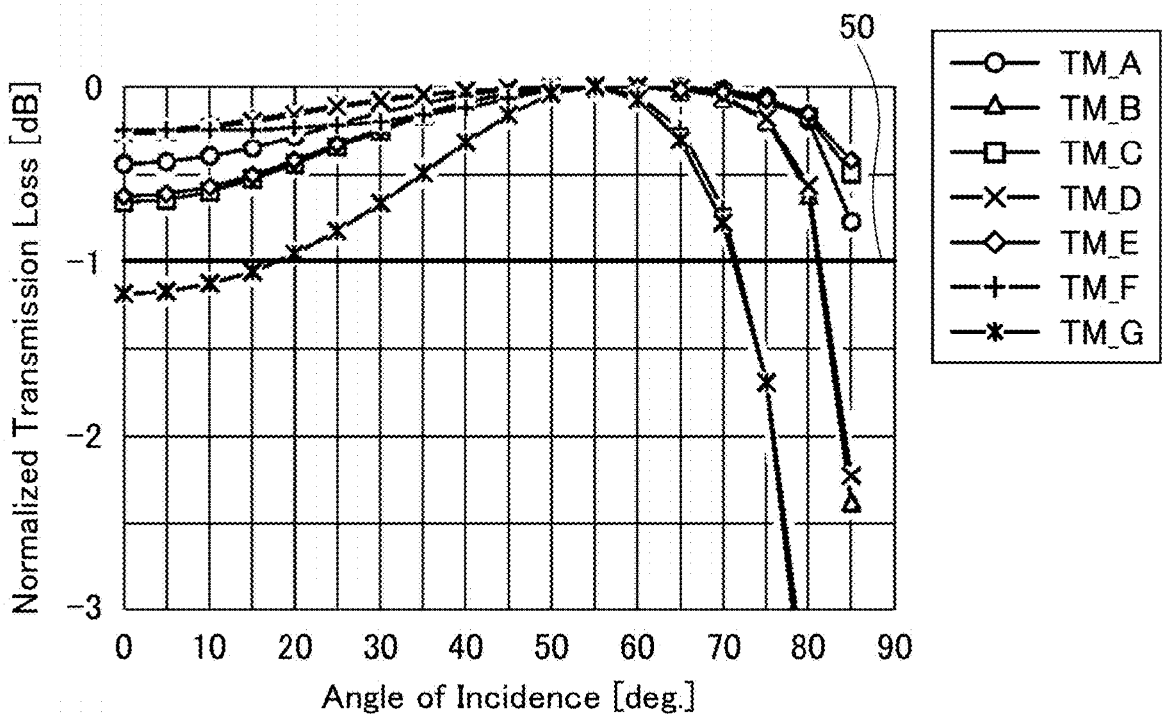

FIG. 11A and FIG. 11B illustrate the relationship between the angle of incidence and normalized transmission loss in Example 6. FIG. 11A illustrates the TE wave whereas FIG. 11B illustrates the TM wave.

As illustrated in Table 4 and FIG. 11A and FIG. 11B, in Example 6, the evaluation was "Bad" under conditions F and G, and "Good" under the other conditions.

Table 5 illustrates the details of conditions A to G in Example 7 and the evaluation result under each condition.

TABLE 5

| | $f/f_0$ | f | α | First layer | $d_1$ | Second layer | $d_2$ | da | Evaluation |
|---|---|---|---|---|---|---|---|---|---|
| A | 1.00 | 28.0 | 1.10 | PTFE | 0.05 | ABS | 3.56 | 3.61 | Good |
| B | 0.95 | 26.6 | 1.10 | PTFE | 0.05 | ABS | 3.56 | 3.61 | Good |
| C | 1.05 | 29.4 | 1.10 | PTFE | 0.05 | ABS | 3.56 | 3.61 | Good |
| D | 1.00 | 28.0 | 1.05 | PTFE | 0.05 | ABS | 3.39 | 3.44 | Good |
| E | 1.00 | 28.0 | 1.15 | PTFE | 0.05 | ABS | 3.72 | 3.77 | Good |
| F | 0.85 | 23.8 | 0.95 | PTFE | 0.05 | ABS | 3.07 | 3.12 | Bad |
| G | 1.15 | 32.2 | 1.15 | PTFE | 0.05 | ABS | 4.05 | 4.10 | Bad |

Figure 12A:
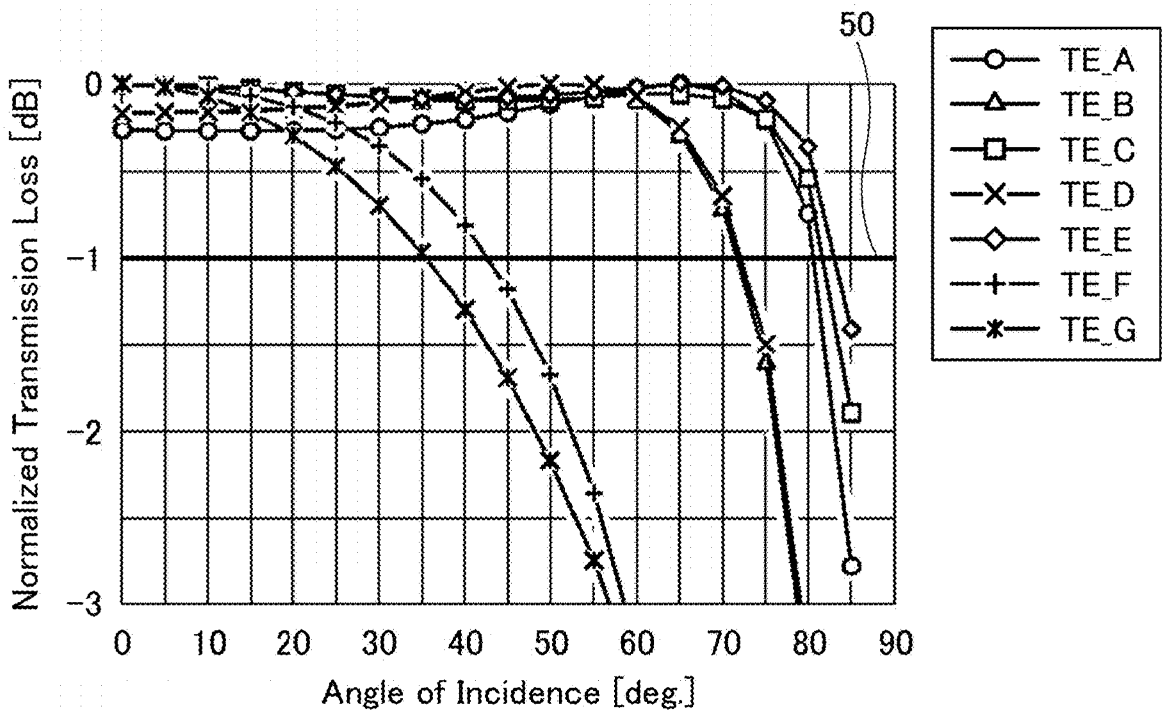
FIG. 12A and FIG. 12B are diagrams illustrating a relationship between an angle of incidence and normalized transmission loss in Example 7, FIG. 12A being a diagram of the TE wave
Figure 12B:
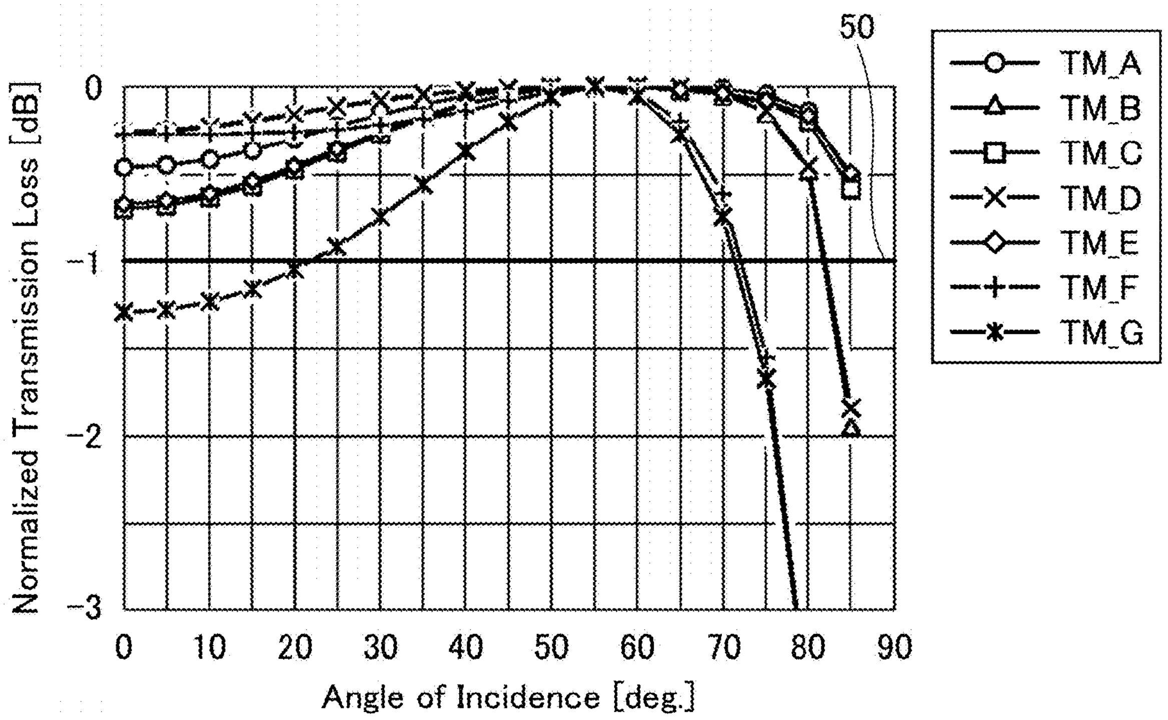

FIG. 12A and FIG. 12B illustrate the relationship between the angle of incidence and normalized transmission loss in Example 7. FIG. 12A illustrates the TE wave whereas FIG. 12B illustrates the TM wave.

As illustrated in Table 5 and FIG. 12A and FIG. 12B, in Example 7, the evaluation was "Bad" under conditions F and G, and "Good" under the other conditions.

Example 8

Table 6 illustrates the details of Condition A and Condition F in Example 8 and the evaluation result under each condition.

TABLE 6

| | $f/f_0$ | f | α | First layer | $d_1$ | Second layer | $d_2$ | da | Evaluation |
|---|---|---|---|---|---|---|---|---|---|
| A | 1.00 | 28.0 | 1.10 | PTFE | 0.05 | Glass | 2.33 | 2.38 | Good |
| F | 0.85 | 23.8 | 0.95 | PTFE | 0.05 | Glass | 2.02 | 2.07 | Bad |

Figure 13A:
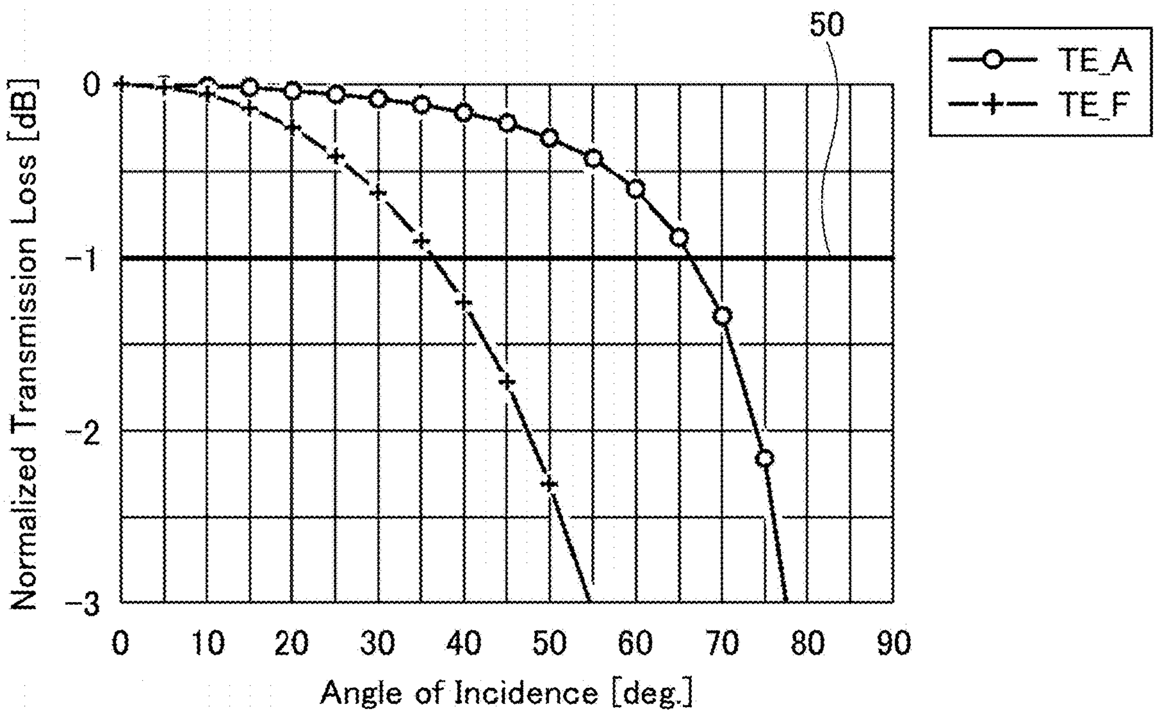
FIG. 13A and FIG. 13B are diagrams illustrating the relationship between the angle of incidence and normalized transmission loss in Example 8, FIG. 13A being a diagram of the TE wave and FIG. 13B being a diagram of the TM wave.
Figure 13B:
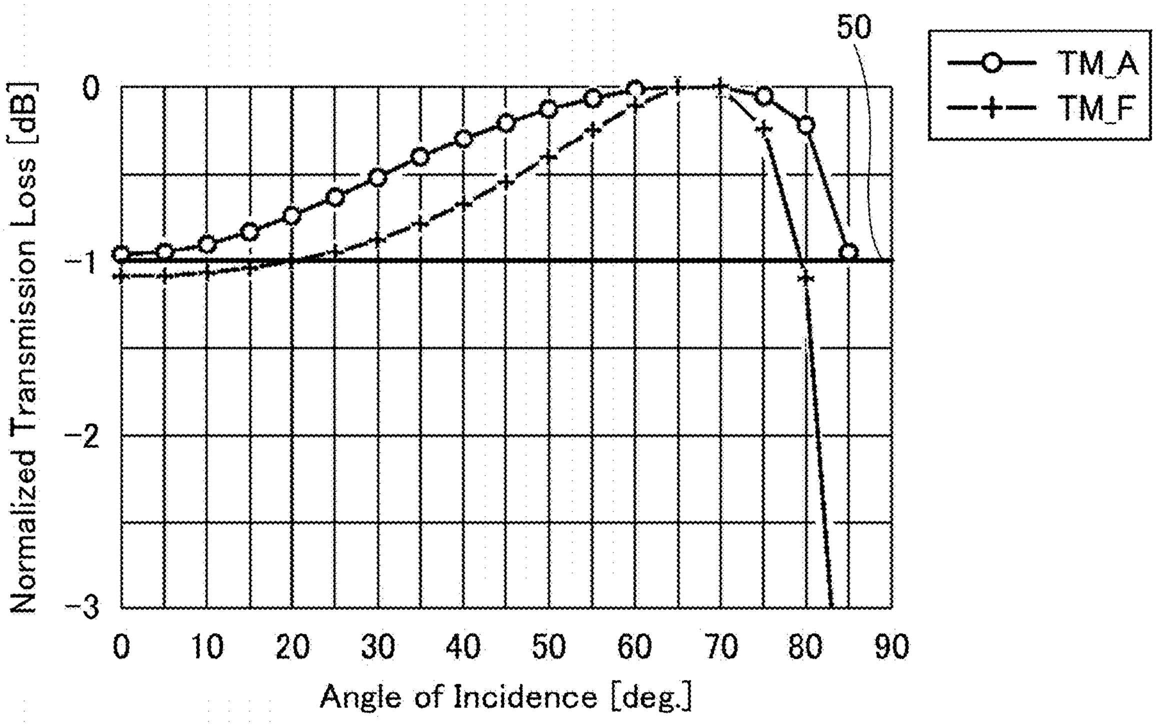

FIG. 13A and FIG. 13B illustrate the relationship between the angle of incidence and normalized transmission loss in Example 8. FIG. 13A illustrates the TE wave whereas FIG. 13B illustrates the TM wave.

As illustrated in Table 6 and FIG. 13A and FIG. 13B, in Example 8, the evaluation was "Bad" under condition A and "Good" under condition F.

Example 9

Table 7 illustrates the details of conditions A to G in Example 9 and the evaluation result under each condition.

TABLE 7

| | $f/f_0$ | f | α | First layer | $d_1$ | Second layer | $d_2$ | da | Evaluation |
|---|---|---|---|---|---|---|---|---|---|
| A | 1.00 | 28.0 | 1.10 | PTFE | 0.05 | PC | 3.66 | 3.71 | Good |
| B | 0.95 | 26.6 | 1.10 | PTFE | 0.05 | PC | 3.66 | 3.71 | Good |
| C | 1.05 | 29.4 | 1.10 | PTFE | 0.05 | PC | 3.66 | 3.71 | Good |
| D | 1.00 | 28.0 | 1.05 | PTFE | 0.05 | PC | 3.49 | 3.54 | Good |
| E | 1.00 | 28.0 | 1.15 | PTFE | 0.05 | PC | 3.88 | 3.93 | Good |
| F | 0.85 | 23.8 | 0.95 | PTFE | 0.05 | PC | 3.15 | 3.20 | Bad |
| G | 1.15 | 32.2 | 1.15 | PTFE | 0.05 | PC | 4.17 | 4.22 | Bad |

Figure 14A:
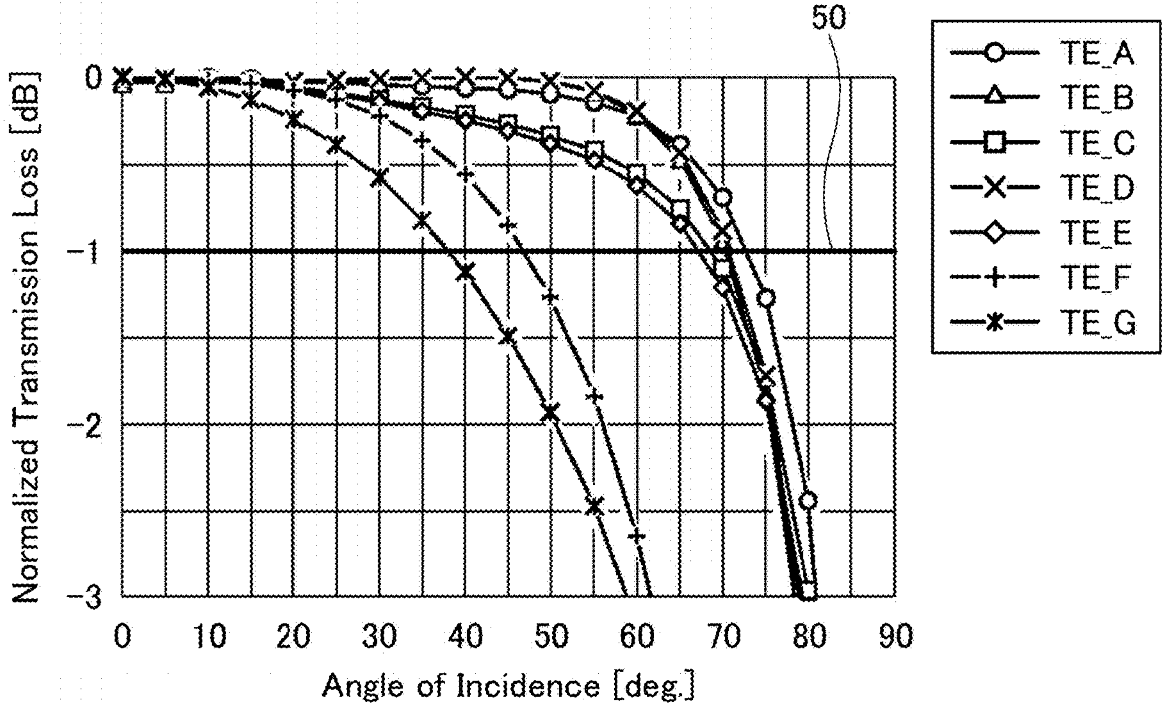
FIG. 14A and FIG. 14B are diagrams illustrating a relationship between an angle of incidence and normalized transmission loss in Example 9, FIG. 14A being a diagram of the TE wave and FIG. 14B being a diagram of the TM wave.
Figure 14B:
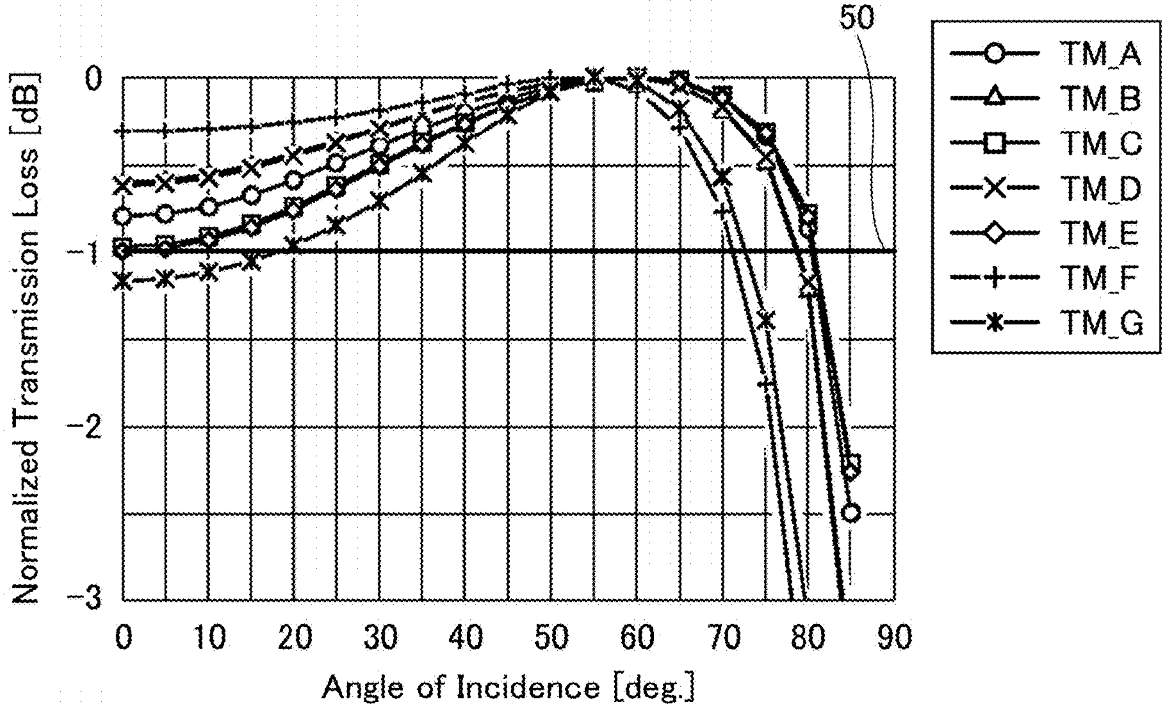

FIG. 14A and FIG. 14B illustrate the relationship between the angle of incidence and normalized transmission loss in Example 9. FIG. 14A illustrates the TE wave whereas FIG. 14B illustrates the TM wave.

As illustrated in Table 7 and FIG. 14A and FIG. 14B, in Example 9, the evaluation was "Bad" under conditions F and G, and "Good" under the other conditions.

Example 10

Table 8 illustrates the details of Condition A and Condition F in Example 10 and the evaluation result under each condition.

TABLE 8

| | $f/f_0$ | f | α | First layer | $d_1$ | Second layer | $d_2$ | da | Evaluation |
|---|---|---|---|---|---|---|---|---|---|
| A | 1.00 | 28.0 | 1.10 | PVDF | 0.05 | Glass | 2.27 | 2.32 | Good |
| F | 0.85 | 23.8 | 0.95 | PVDF | 0.05 | Glass | 1.96 | 2.01 | Bad |

Figure 15A:
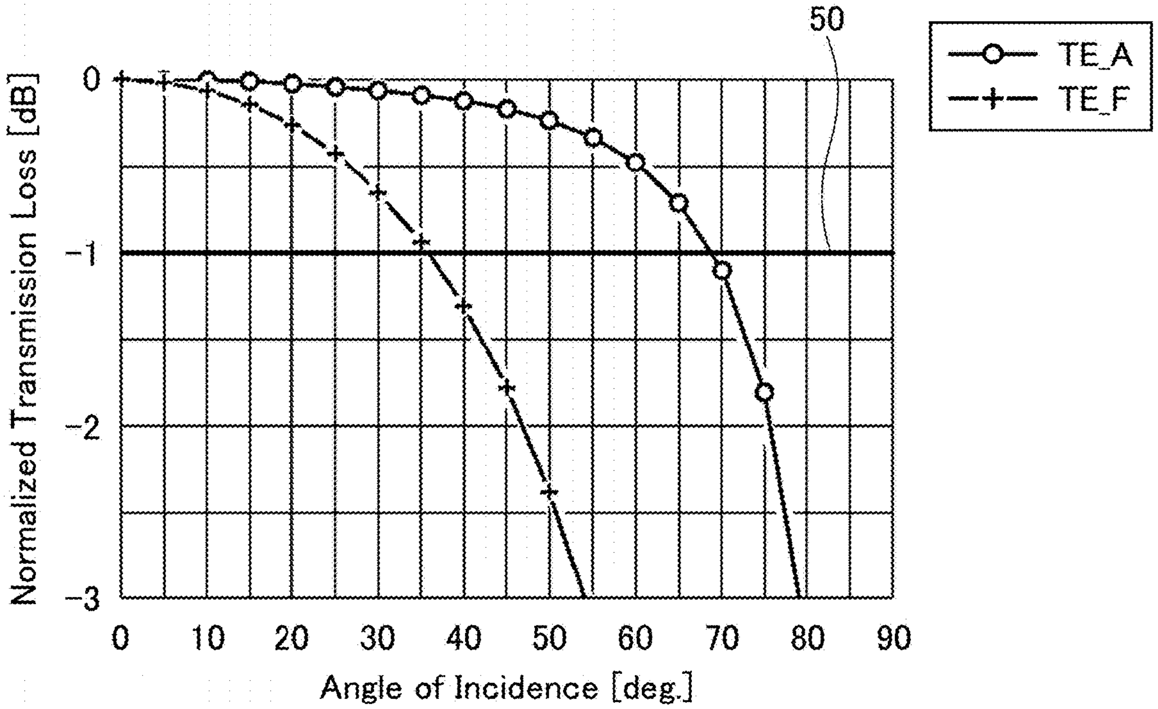
FIG. 15A and FIG. 15B are diagrams illustrating the relationship between an angle of incidence and normalized transmission loss in Example 10, FIG. 15A being a diagram of the TE wave and FIG. 15B being a diagram of the TM wave.
Figure 15B:
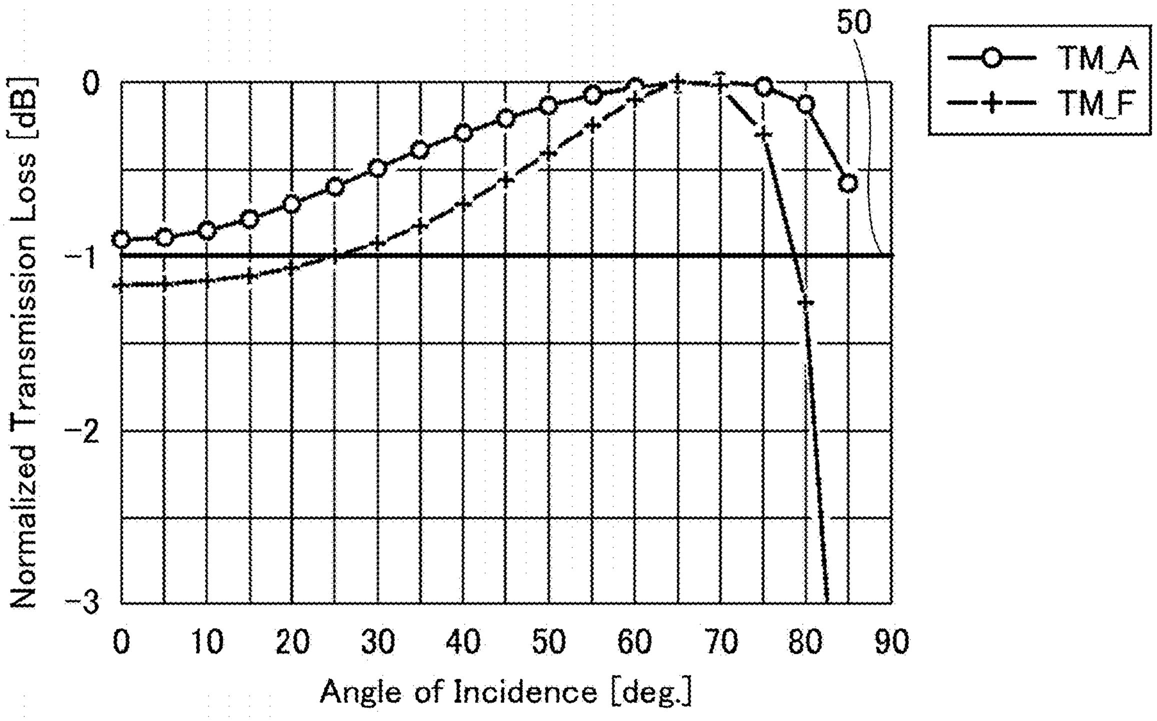

FIG. 15A and FIG. 15B illustrate the relationship between the angle of incidence and normalized transmission loss in Example 10. FIG. 15A illustrates the TE wave whereas FIG. 15B illustrates the TM wave.

As illustrated in Table 8 and FIG. 15A and FIG. 15B, in Example 10, the evaluation was "Good" under condition A and "Bad" under condition F.

As described above, the protective plate-equipped reflector 1*a* can obtain substantially the same effect as the protective plate-equipped reflector 1 according to the first embodiment. From the standpoint of widening the range satisfying the criterion in which the incident angle is 60 degrees or more and normalized transmission loss is less than or equal to the normalized transmission loss threshold of 1 dB, it is preferable to use a material with a low relative permittivity for both the first dielectric layer 51 and the second dielectric layer 52.

In the present embodiment, although configurations in which the protective plate-equipped reflector 1 and the protective plate-equipped reflector 1*a* reflect incoming radio waves are illustrated, substantially the same working effect can be obtained in configurations in which protective plate-equipped reflector 1 and the protective plate-equipped reflector 1*a* re-radiate incoming radio waves.

Although preferred embodiments and other forms of the present disclosure have been described above in detail as examples, the present disclosure is by no means limited to these examples, and a variety of modifications and replacements can be introduced to the above examples without departing from the scope set forth in the claims.

What is claimed is:

1. A protective plate-equipped reflective member comprising:

a reflective member that reflects or re-radiates a radio wave incident thereon; and a protective plate that is installed on a radio wave-incident side of the reflective member, wherein $d=\alpha\times\lambda_0/(1.75\times\varepsilon_r^{0.555})$ and α is greater than or equal to 1 and less than or equal to 1.25, where a wavelength specified with respect to an operating center frequency $f_0$ [Hz] is denoted by $\lambda_0$ [mm], a plate thickness of the protective plate is denoted by d [mm], a relative permittivity of the protective plate at the operating center frequency $f_0$ [Hz] is denoted by $\varepsilon_r$, and a constant is denoted by α.

2. The protective plate-equipped reflective member according to claim 1, wherein the relative permittivity of the protective plate is 2 or more and 10 or less.

3. The protective plate-equipped reflective member according to claim 1, wherein $\Delta f/f_0$ is 10% or more, where a frequency range, in which an angle of incidence of the radio wave at which normalized transmission loss of the protective plate is 1 dB is 60 degrees or more, around the operating center frequency $f_0$ [Hz], is denoted by Δf [Hz].

4. The protective plate-equipped reflective member according to claim 1, wherein a material of the protective plate is a fluorine resin or glass.

5. The protective plate-equipped reflective member according to claim 1, wherein a material of the protective plate is polytetrafluoroethylene.

6. The protective plate-equipped reflective member according to claim 1, wherein normalized transmission loss of the protective plate decreases as an angle of incidence of the radio wave changes from 0 degrees to 50 degrees at the operating center frequency $f_0$ [Hz].

7. The protective plate-equipped reflective member according to claim 1, wherein the protective plate includes a first dielectric layer and a second dielectric layer that is provided between the first dielectric layer and the reflective member, and $\varepsilon_{ra}=\{(d_1+d_2)\times\varepsilon_{r1}\times\varepsilon_{r2}\}/(d_1\times\varepsilon_{r2}+d_2\varepsilon\varepsilon_{r1})$ $da=d_1+d_2$, $da=\alpha\times\lambda_0/(1.75\times\varepsilon_{ra}^{0.555})$, and a is greater than or equal to 1 and less than or equal to 1.25, where a layer thickness of the first dielectric layer is denoted by $d_1$ [mm], a relative permittivity of the first dielectric layer is denoted by $\varepsilon_{r1}$, a layer thickness of the second dielectric layer is denoted by $d_2$ [mm], a relative permittivity of the second dielectric layer is denoted by $\varepsilon_{r2}$, an effective relative permittivity of the protective plate is denoted by $\varepsilon_{ra}$, and a plate thickness of the protective plate is denoted by da.

* * * * *